United States Patent
Lo et al.

(10) Patent No.: US 11,913,733 B2
(45) Date of Patent: Feb. 27, 2024

(54) HEAT TRANSFERRING DEVICE AND HEAT TRANSFERRING COMPONENT THEREOF

(71) Applicant: Asia Pacific Fuel Cell Technologies, Ltd., Miaoli (TW)

(72) Inventors: Wei-Pin Lo, Miaoli (TW); Wen-Yen Huang, Miaoli (TW); Chin-Hsien Cheng, Miaoli (TW)

(73) Assignee: ASIA PACIFIC FUEL CELL TECHNOLOGIES, LTD., Zhunan (TW)

( * ) Notice: Subject to any disclaimer, the term of this patent is extended or adjusted under 35 U.S.C. 154(b) by 56 days.

(21) Appl. No.: 17/344,729

(22) Filed: Jun. 10, 2021

(65) Prior Publication Data
US 2021/0389053 A1    Dec. 16, 2021

(30) Foreign Application Priority Data
Jun. 12, 2020   (TW) ................................. 109119975

(51) Int. Cl.
*F28F 9/00*     (2006.01)
*F28D 9/00*     (2006.01)
(Continued)

(52) U.S. Cl.
CPC ................ *F28F 9/002* (2013.01); *F28D 1/06* (2013.01); *F28F 3/086* (2013.01); *F28F 21/065* (2013.01);
(Continued)

(58) Field of Classification Search
CPC .. F28D 1/035; F28D 1/06; F28F 3/086; F28F 3/12; F28F 3/14; F28F 9/002;
(Continued)

(56) References Cited

U.S. PATENT DOCUMENTS 6,418,275 B1 *   7/2002   Yang .................... H01M 8/065
                                                    429/421
6,722,460 B2     4/2004   Yang et al.
(Continued)

FOREIGN PATENT DOCUMENTS

CN    107223290 B    10/2019
CN    111430754 A    7/2020
(Continued)

OTHER PUBLICATIONS

Machine translation of JP-2008142177-A, retrieved Sep. 28, 2022 (Year: 2022).*

*Primary Examiner* — Eric S Ruppert
*Assistant Examiner* — Hans R Weiland
(74) *Attorney, Agent, or Firm* — KIRTON McCONKIE; Evan R. Witt

(57) ABSTRACT

The present disclosure provides a heat transferring device and a heat transferring component thereof. The heat transferring device includes a heat transferring component, a lower plate and a positioning component. The heat transferring component is in a shape of pouch and includes at least one input end and at least one output end to allow a fluid to be inputted and outputted. The lower plate includes at least one first perforation. The positioning component is disposed on an exterior of the heat transferring component. An end of the positioning component is connected to the lower plate.

20 Claims, 22 Drawing Sheets

(51) Int. Cl.
  *F28D 1/06* (2006.01)
  *H01M 8/04007* (2016.01)
  *H01M 8/04082* (2016.01)
  *F28F 3/08* (2006.01)
  *F28F 21/06* (2006.01)
  *F28F 21/02* (2006.01)
  *F28F 21/04* (2006.01)
  *F28F 23/00* (2006.01)
  *F28D 21/00* (2006.01)

(52) U.S. Cl.
  CPC ... *H01M 8/04074* (2013.01); *H01M 8/04208* (2013.01); *F28D 9/0025* (2013.01); *F28D 2021/0047* (2013.01); *F28F 21/02* (2013.01); *F28F 21/04* (2013.01); *F28F 23/00* (2013.01); *H01M 8/04007* (2013.01)

(58) Field of Classification Search
  CPC ........ F28F 9/0025; F28F 21/02; F28F 21/065; F28F 23/00; H01M 8/04007; H01M 8/04074; H01M 8/04208
  See application file for complete search history.

(56) References Cited

U.S. PATENT DOCUMENTS

| | | | |
|---|---|---|---|
| 8,628,609 B2 | 1/2014 | Ornath | |
| 2002/0177035 A1* | 11/2002 | Oweis | H01M 10/6567 |
| | | | 429/120 |
| 2003/0215684 A1* | 11/2003 | Yang | H01M 8/065 |
| | | | 429/513 |
| 2006/0207745 A1 | 9/2006 | Koda et al. | |
| 2007/0037050 A1* | 2/2007 | Rigobert | H01M 50/291 |
| | | | 165/83 |
| 2013/0089925 A1* | 4/2013 | Damren | F28F 9/0131 |
| | | | 435/303.1 |
| 2013/0340624 A1* | 12/2013 | Webber | F28F 3/12 |
| | | | 99/276 |
| 2015/0159967 A1* | 6/2015 | Furumura | F28F 3/08 |
| | | | 165/76 |

FOREIGN PATENT DOCUMENTS

| | | | |
|---|---|---|---|
| EP | 2354741 | A2 | 8/2011 |
| JP | S53011716 | U | 1/1978 |
| JP | 2002340298 | A | 11/2002 |
| JP | 2003021298 | A | 1/2003 |
| JP | 2005082209 | A | 3/2005 |
| JP | 2007045301 | A | 2/2007 |
| JP | 2008142177 | A | 6/2008 |
| JP | 2008142177 | A * | 6/2008 |
| JP | 2012007633 | A | 1/2012 |
| JP | 2014091955 | A | 5/2014 |
| JP | 2016500433 | A | 1/2016 |
| JP | 2017211029 | A | 11/2017 |
| TW | 555160 | U | 9/2003 |
| TW | M247431 | U | 10/2004 |
| TW | M430705 | U | 6/2012 |
| WO | 2019075121 | A1 | 4/2019 |

* cited by examiner

US 11,913,733 B2

HEAT TRANSFERRING DEVICE AND HEAT TRANSFERRING COMPONENT THEREOF

CROSS-REFERENCE TO RELATED APPLICATION

This application claims priority to Taiwan Patent Application No. 109119975, filed on Jun. 12, 2020 and entitled "HEAT TRANSFERRING DEVICE". The entire contents of the above-mentioned patent application are incorporated herein by reference for all purposes.

FIELD OF THE INVENTION

The present disclosure relates to a heat transferring device, and more particularly to a heat transferring device capable of transferring the thermal energy through the fluid so as to provide energy.

BACKGROUND OF THE INVENTION

A conventional heating device of a gas storage tank is shown in Japanese Patent Publication No. 4088198 entitled "HYDROGEN STORAGE TANK CONTAINER AND HEATING DEVICE THEREOF" and FIG. 1. The container is capable of accommodating two gas storage canisters to supply the hydrogen required by the fuel cell. The fuel cell also includes a cooling water channel. Because of the heat generated owing to the chemical reaction at the cathode electrode, the temperature of the cooling water circulating in the cooling water channel is increased and the cooling water flows out through a discharge port of the cooling water channel. The container includes a support, a water jacket and a seal member. The support is used for holding the gas storage canister. The water jacket is disposed on the support and in fluid communication with the discharge port of the cooling water channel of the fuel cell. When the gas storage canister is disposed on the support, the water jacket is flatly attached on and surrounds the gas storage canister. Thereby, the cooling water with high temperature flowing from the discharge port of the cooling water channel of the fuel cell supplies the thermal energy to the gas storage canister. After the gas storage canister absorbs the thermal energy, the hydrogen stored inside the metal hydride can be discharged. On the other hand, during the process of filling the hydrogen, heat dissipating or cooling must be performed on the gas storage canister. However, there are drawbacks such as inconvenience of assembling, high time cost of assembling, inconvenience of addressing the leakage, large volume, heavy weight and poor thermal conduction efficiency occurring in the mentioned device with the water jacket.

Therefore, there is a need of providing a heat transferring device not easily leaking the thermal conductive fluid, easy to be assemble and fixed, having light weight, small volume and excellent thermal conduction efficiency so as to obviate the drawbacks encountered from the prior arts.

SUMMARY OF THE INVENTION

It is an object of the present disclosure to provide a heat transferring device. By the arrangement of the heat transferring component, the lower plate and the positioning component, the purpose of transferring heat, easily assembling and fixing.

It is another object of the present disclosure to provide a heat transferring component with small volume, light weight and excellent thermal conduction efficiency.

In accordance with an aspect of the present disclosure, there is provided a heat transferring device. The heat transferring device at least includes a heat transferring component, a lower plate and a positioning component. The heat transferring component is in a shape of pouch and includes at least one input end and at least one output end to allow a fluid to be inputted and outputted. The lower plate includes at least one first perforation. The positioning component is disposed on an exterior of the heat transferring component. An end of the positioning component is connected to the lower plate.

In an embodiment, the heat transferring device further includes an upper plate including at least one second perforation. Another end of the positioning component is connected to the upper plate.

In an embodiment, the heat transferring device further includes at least one supporting component or at least one plate component connected to the upper plate and the lower plate.

In an embodiment, the lower plate further includes at least one small through holes. A quick connector is connected to the lower plate and through the small through hole and is spatially corresponding to the first perforation.

In an embodiment, the lower plate or the positioning component includes at least one through hole to allow the input end and the output end of the heat transferring component to pass therethrough and be protruded from the heat transferring component.

In an embodiment, the heat transferring component further includes at least one fixing sheets on the periphery.

In an embodiment, the heat transferring component further includes a scraper plate and a pressing plate. The scraper plate is connected to the upper plate, and the pressing plate is disposed on the scraper plate. The heat transferring component is disposed between the upper plate and the lower plate.

In an embodiment, the heat transferring component further includes an upper plate component and a lower plate component. The upper plate component is connected to the upper plate, and the lower plate component is connected to the lower plate.

In an embodiment, the heat transferring component further includes a carrying plate. The carrying plate is connected to the upper plate, and the fixing sheet is disposed between the carrying plate and the upper plate. The fixing sheet is fixed on the supporting component or the positioning component through at least one connecting component.

In an embodiment, the lower plate further includes at least one positioning groove disposed on the periphery of the first perforation. A gas storage canister is provided and includes a positioning ring and a convex rib disposed on the positioning ring. The convex rib of the positioning ring is allowed to pass through the positioning grooves, and the gas storage canister is fastened by rotation.

In an embodiment, the heat transferring device further includes at least one guiding component. The guiding component is disposed on the lower plate for guiding and positioning a gas storage canister.

In an embodiment, the heat transferring device further includes a clamping portion. The clamping portion includes a buckle and a fastening portion or a steel ring. The upper plate further includes a periphery portion. The buckle is disposed on the periphery portion of the upper plate and is connected with the fastening portion or the steel ring.

In accordance with another aspect of the present disclosure, there is provided a heat transferring component. The heat transferring component is in a shape of flexible pouch and includes at least one input end and at least one output end to allow a fluid to be inputted and outputted.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
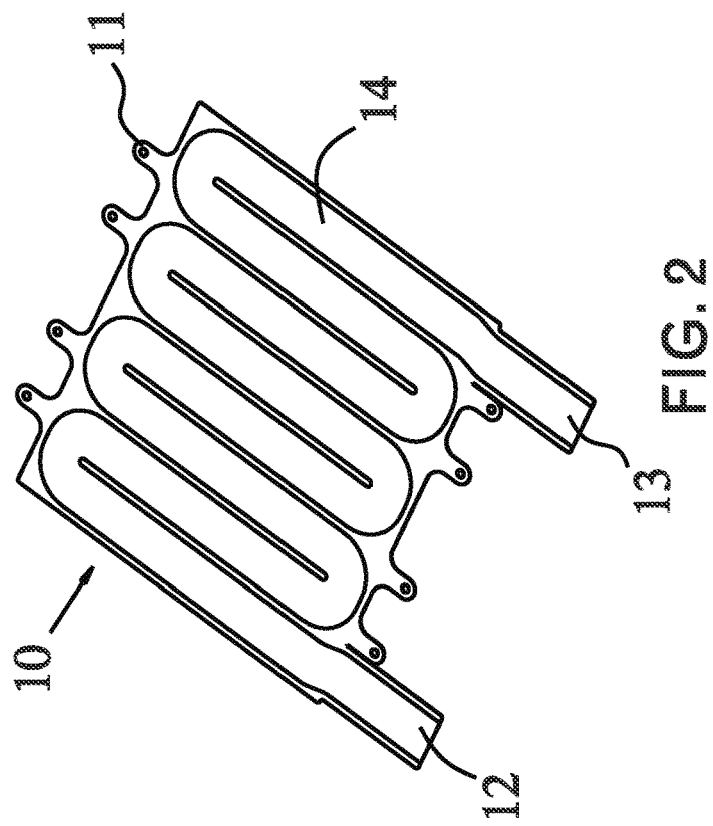
FIG. 2 is a schematic perspective view illustrating a heat transferring component according to an embodiment of the present invention.
Figure 1:
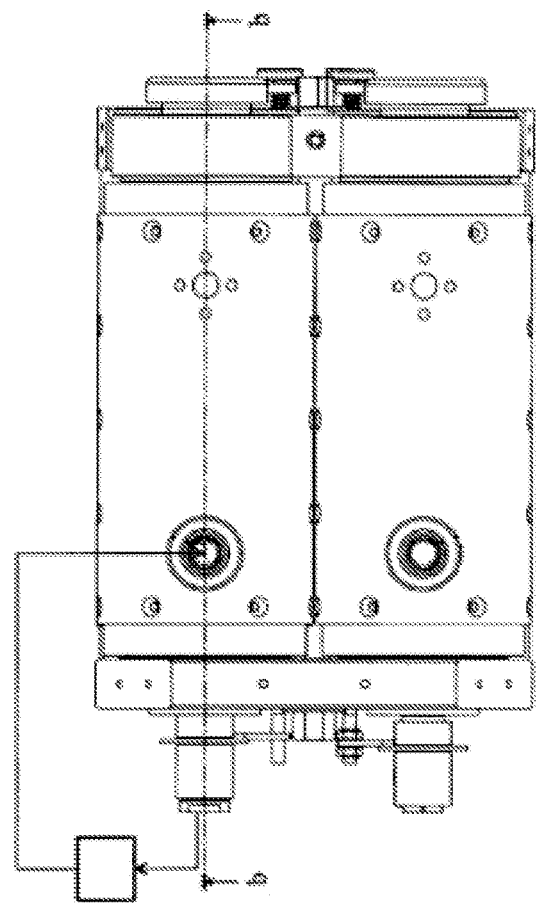
FIG. 1 is a schematic perspective view illustrating a heating device for a gas storage canister in prior art.
Figure 3A:
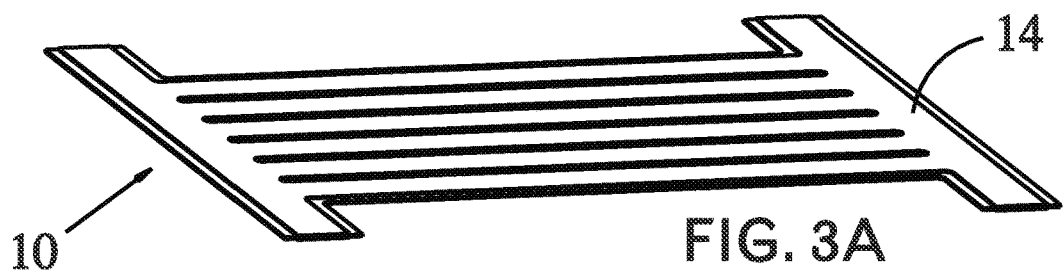
FIGS. 3A to 3J are schematic perspective views illustrating the changes of the flow channels of the heat transferring component of the present invention.
Figure 3B:
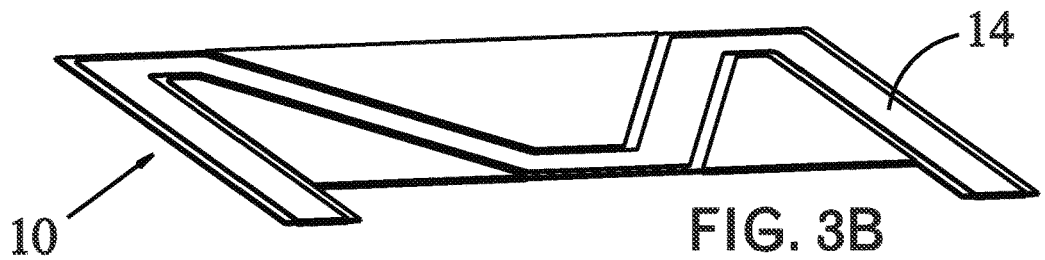
Figure 3C:
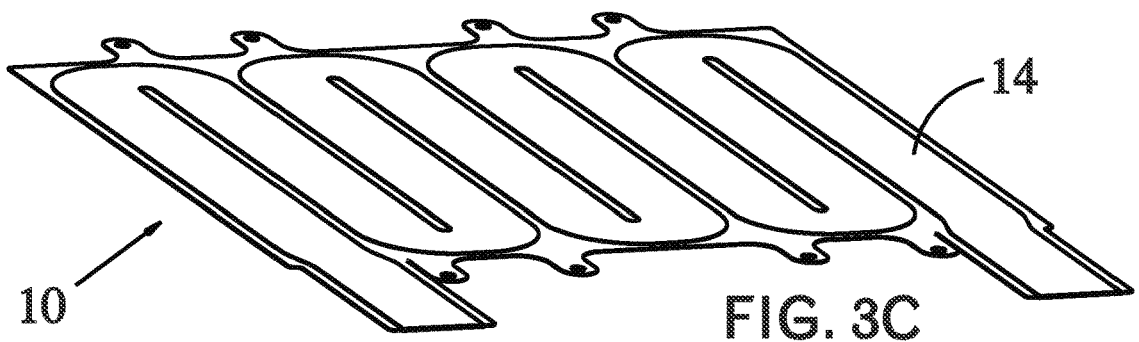
Figure 3D:
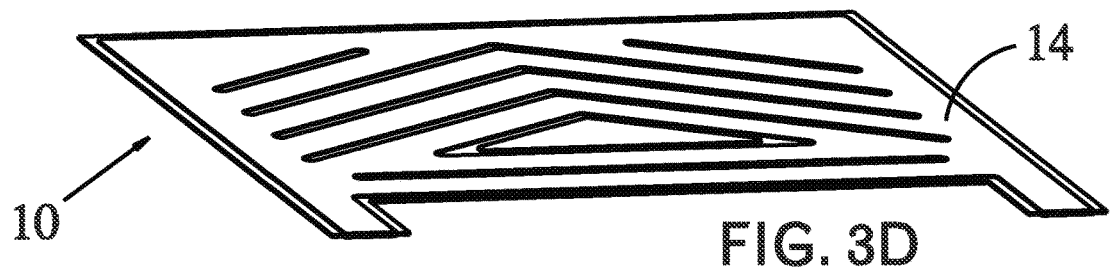
Figure 3E:
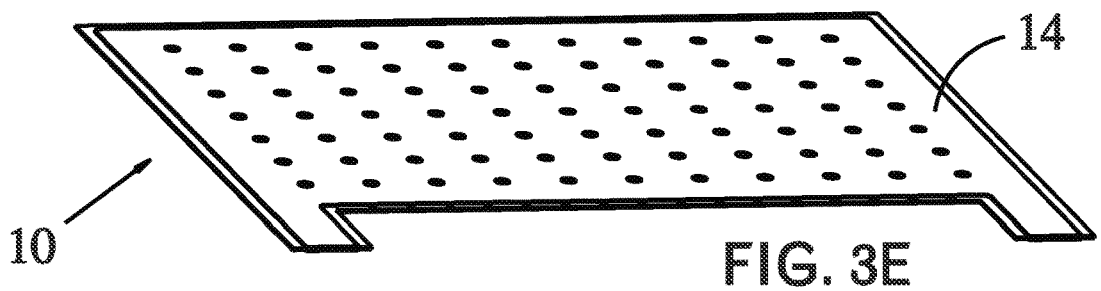
Figure 3F:
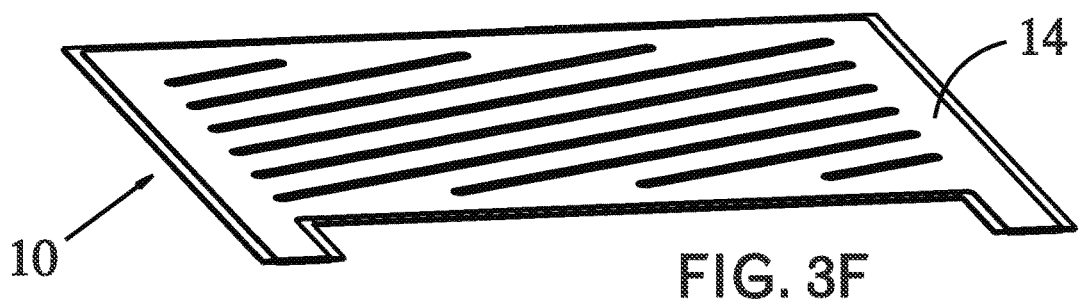
Figure 3G:
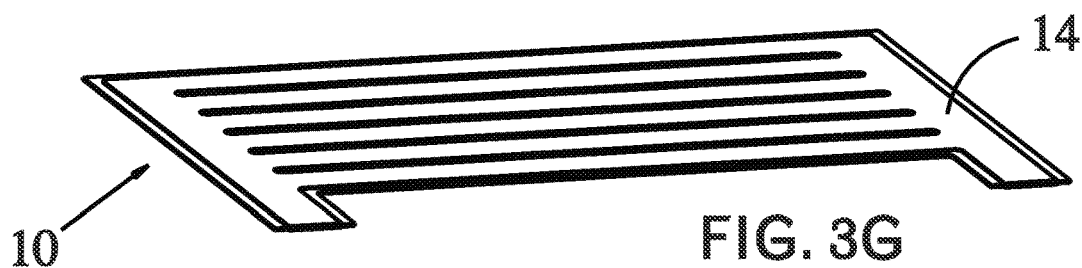
Figure 3H:
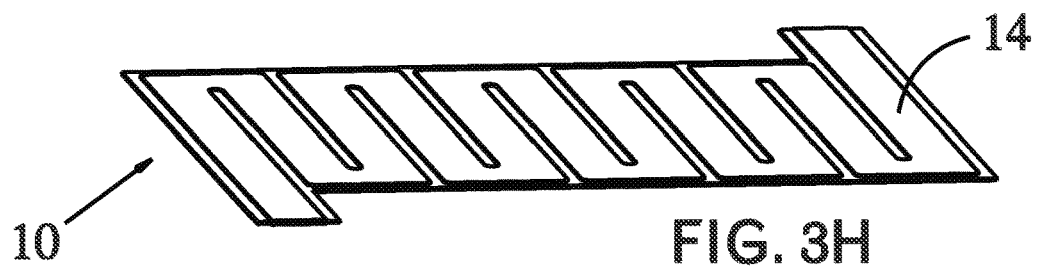
Figure 3I:
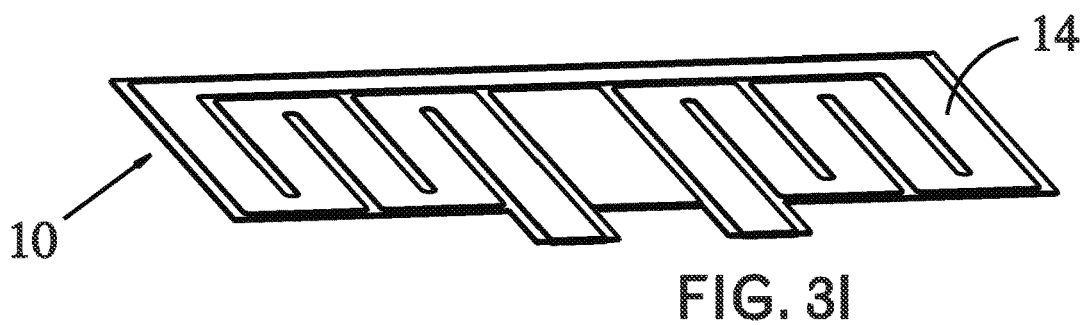
Figure 3J:
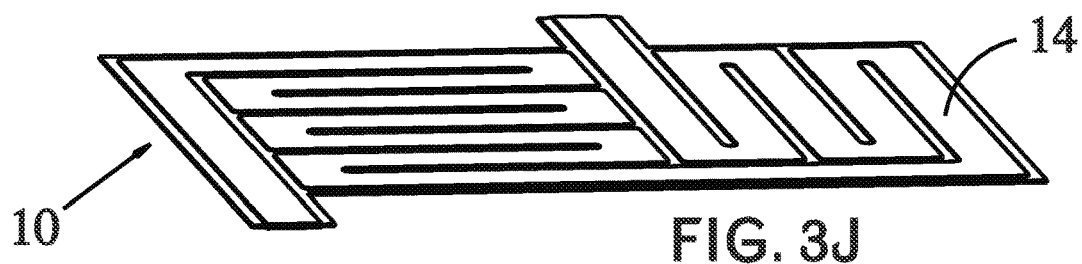

FIG. 2 illustrates the heat transferring component 10 according of the present invention. The heat transferring component 10 has a conduction function capable of transferring heat between cold substance and hot substance. When the heat transferring component 10 is flatten, the profile thereof is substantially a rectangular thin-plate pouch, and the heat transferring component 10 can be rolled up along a long side or a short side thereof. In this embodiment, the heat transferring component 10 is rolled up and is formed like a hollowed cylinder, so that a gas storage canister can be disposed therein. The heat transferring component 10 can be designed according to the practical usage requirements and can be changed to in different shapes. The heat transferring component 10 is formed by the two films which have the characteristics of tensile resistance, acid and alkali resistance, corrosion resistance and friction resistance. The two films are processed by the hot-pressing process or the ultrasonic welding process and thereafter processed by the cutting process or the stamping process according to the designed pattern, thereby substantially forming a flexible pouch in desired shape. In this embodiment, the heat transferring component 10 includes at least one fixing sheet 11. The fixing sheet 11 is disposed on a proper position on the periphery of the heat transferring component 10. The heat transferring component 10 further includes at least one input end 12 and at least one output end 13 extended from two sides of the heat transferring component 10. The input end 12 and the output end 13 are the entrance and the exit for the fluid, respectively. The directions of the input end 12 and the output end 13 can be adjusted according to the requirements without any limitation. The heat transferring component 10 further includes at least one flow channel 14 disposed therein. The flow channel 14 can be designed in the shapes as shown in FIGS. 3A to 3J, which sequentially is H-shape, M-shape/W-shape, S-shape, V-shape, regular shape, unregular shape, U-shape, N-shape/Z-shape, inlet-and-outlet-on-center shape and inlet-and-outlet-on-sides shape, but not limited thereto. The shape of the flow channel 14 can be changed according to the practical requirements. For example, the flow channel 14 in the H-shape as shown in FIG. 3A can be connected to different cold medium and heat medium pipelines, and the route of the flow channel 14 can be switched according to the requirements (not shown). The material of the heat transferring component 10 can be selected from the groups consisting of high molecular polymers, such as (A) natural rubbers, e.g., polyisoprene; (B) synthetic rubbers, e.g., polybutadiene, chlorinated butyl rubber, neoprene, fluorinated hydrocarbon rubber, fluorosilicone rubber, hydrogenated butadiene rubber, butyl rubber, methyl vinyl silicone rubber, acrylonitrile butadiene rubber, styrene butadiene rubber, polysiloxane, polyurethane; (C) thermoplastics, e.g., polyvinyl chloride, polysulfone, polyether sulfones, polyvinylidene fluoride; (D) composite materials composed of elastic fiber and rubber, e.g., the composite material composed of one of polyamide fiber, polyester fiber and polyvinylidene fluoride fiber and one of the rubbers mentioned in the group (B); and (E) composite materials composed of elastic fiber and thermoplastics, e.g., the composite material composed of one of polyamide fiber, polyester fiber and polyvinylidene fluoride fiber and one of the thermoplastics mentioned in the group (C), but not limited thereto. In addition, to improve the thermal conductive efficiency of the heat transferring component 10, a conductive material is doped in every material of the high molecular polymers mentioned above in a proportion ranged between 1 wt % to 30 wt %. For example, the conductive material is silicon dioxide, titanium dioxide, carbon particles, carbon nanotubes, etc.

Figure 4:
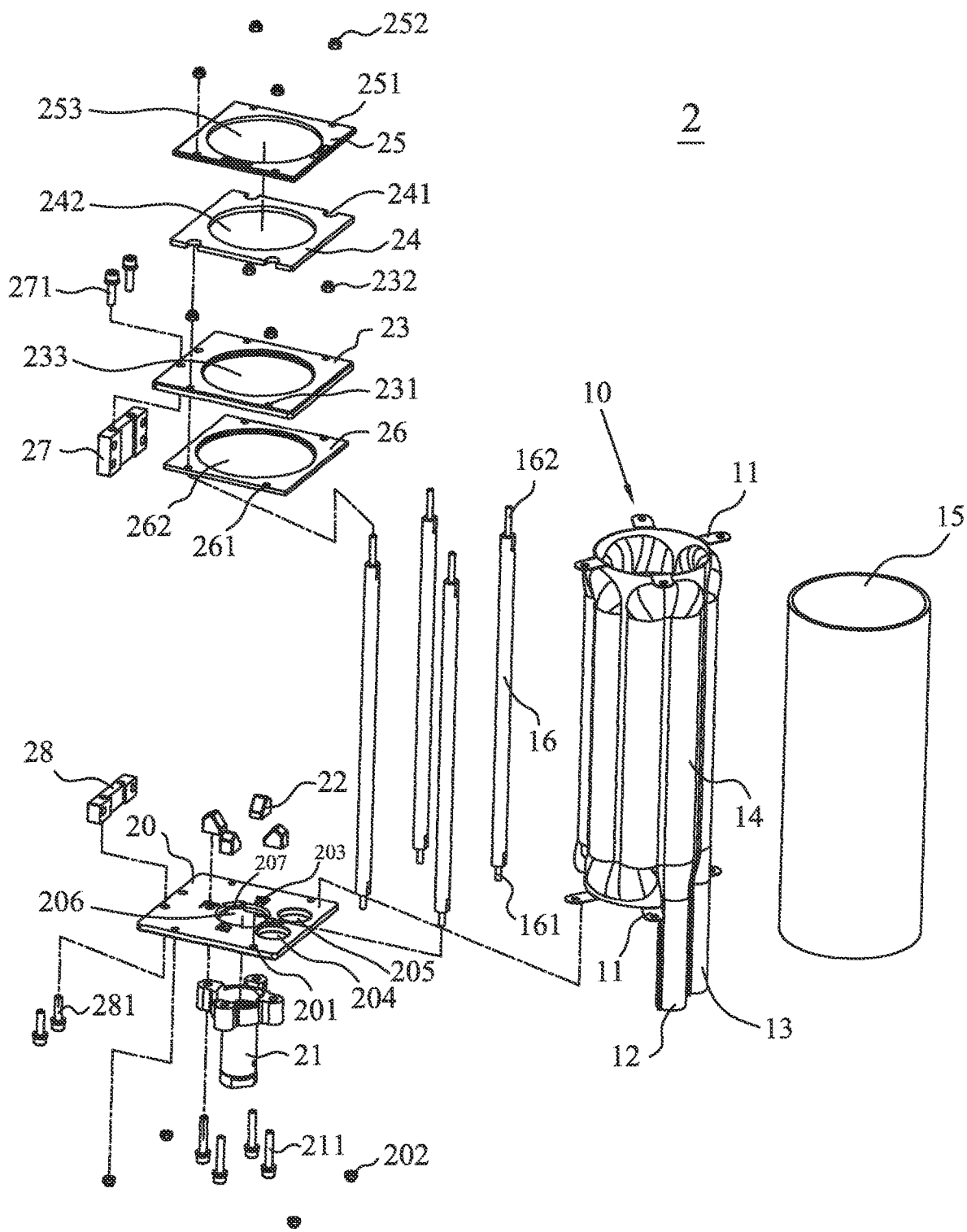
FIG. 4 is an exploded view illustrating the heat transferring device according to a first embodiment of the present invention.
Figure 5:
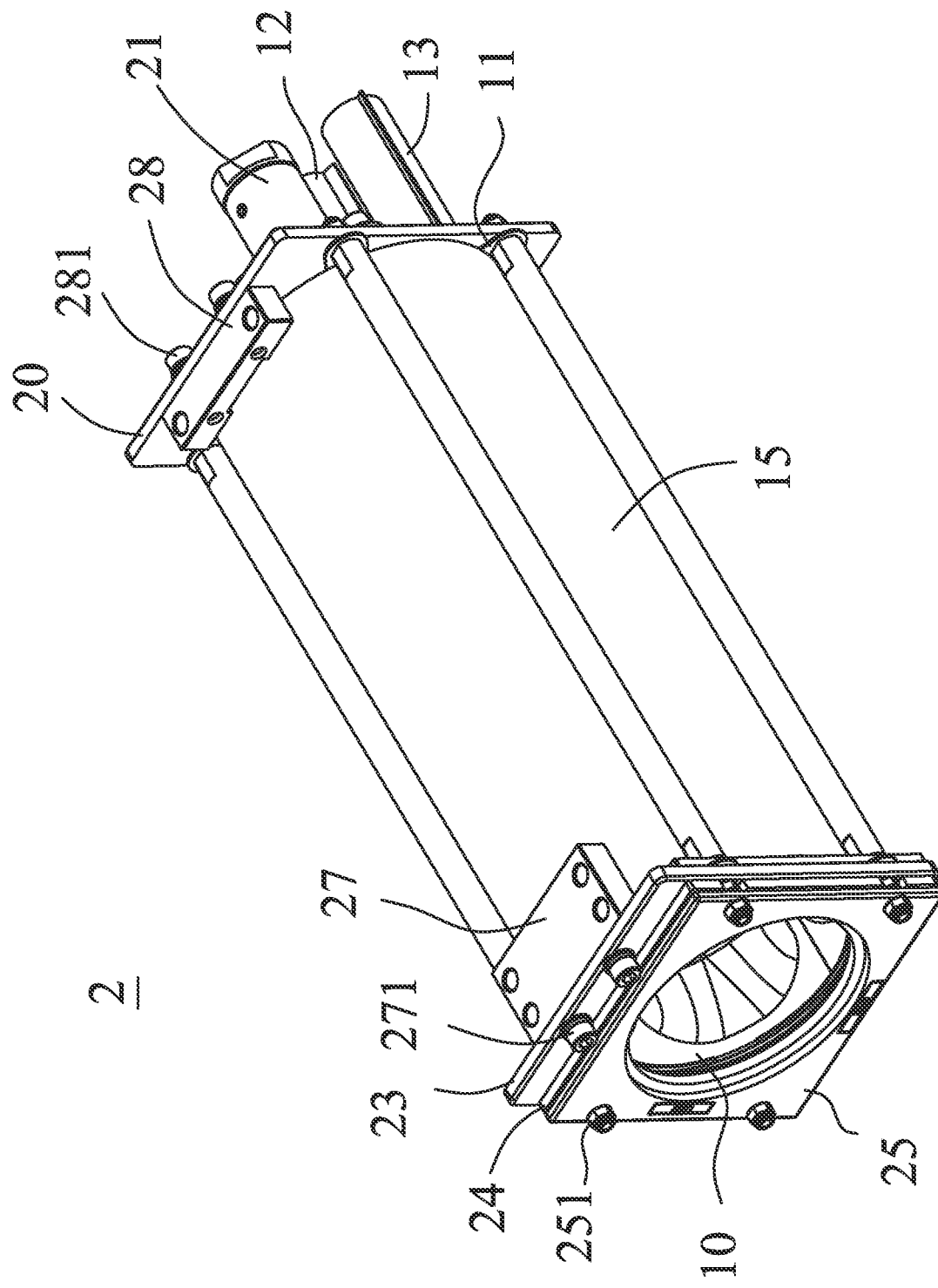
FIG. 5 is a combination view illustrating the heat transferring device according to a first embodiment of the present invention.
Figure 7:
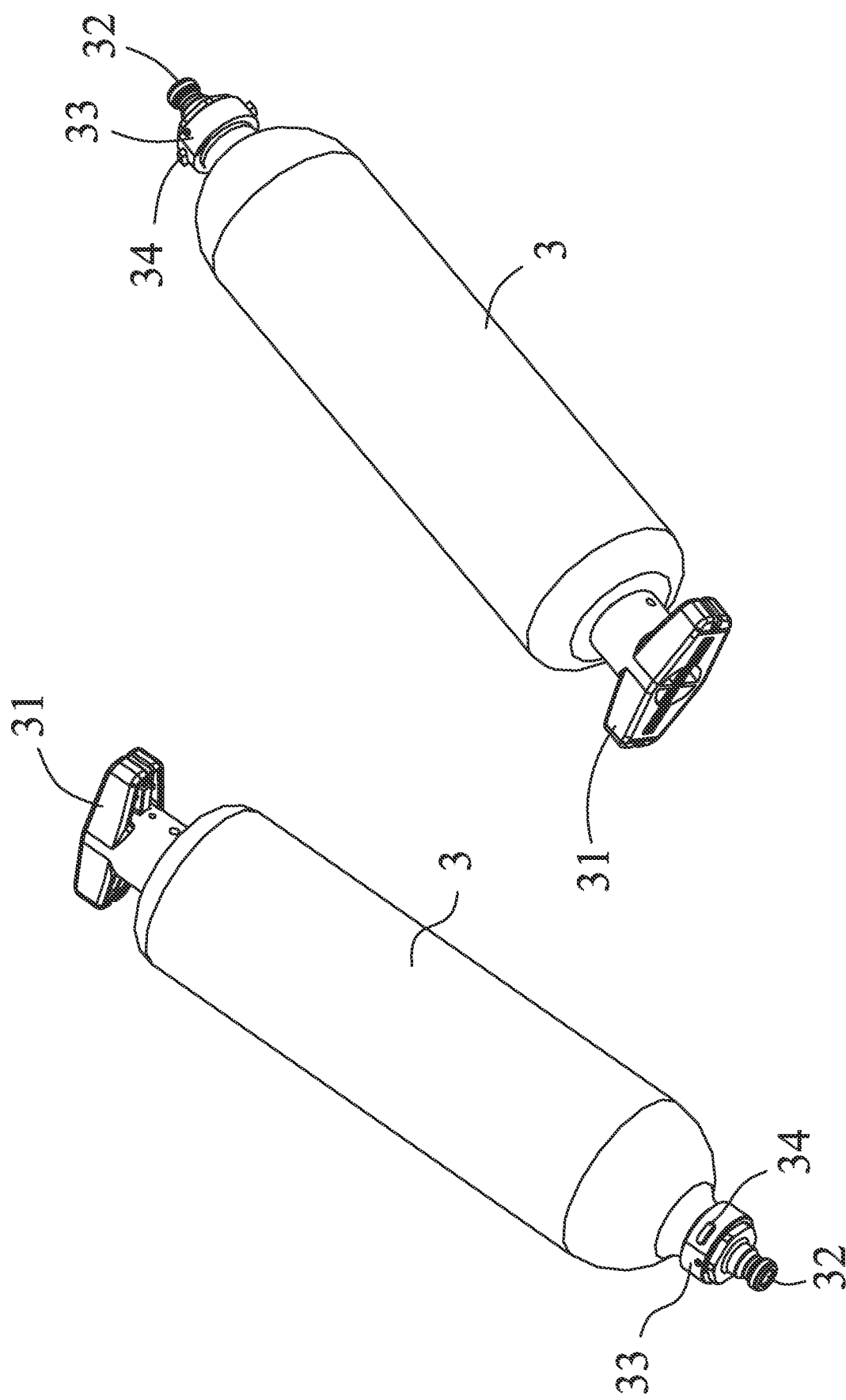
FIGS. 7A and 7B are schematic perspective views illustrating a gas storage canister utilized in the present invention.

In some embodiments of the present invention, FIGS. 4 and 5 are the exploded view and the combination view illustrating the heat transferring device 2. First, as shown in FIGS. 4 and 5, the heat transferring component 10 is rolled up as the hollowed cylinder according to the designed shape. In this embodiment, the heat transferring component 10 includes a plurality of the fixing sheets 11. The fixing sheets 11 have perforations and are disposed on the proper positions on the periphery of the heat transferring component 10. The input end 12 and the output end 13 for the thermal conductive fluid are extended from the two sides of the heat transferring component 10. Second, the heat transferring device 2 further includes a quick connector 21 and a lower plate 20. The quick connector 21 includes a plurality of first connecting components 211. The lower plate 20 includes a first perforation 206 and a plurality of small through holes (or screw holes) 203 surrounding the first perforation 206. The first connecting components 211 passes through the small through holes 203, so that the quick connector 21 is combined to the lower plate 20 and spatially corresponding to the first perforation 206. That is, the first connecting components 211 of the quick connector 21 pass through the small through holes 203 of the lower plate 20. In this embodiment, the heat transferring component 10 further includes a plurality of supporting components 16, and each of the supporting components 16 includes an end portion 161 and another end portion 162. The end portions 161 of the supporting components 16 are respectively passed through the fixing sheets 11 disposed on a lower side of the heat transferring component 10 and are connected to the lower plate 20 including the through holes 201. That is, the end portions 161 of the supporting component 16 also respectively pass through the through holes 201 of the lower plate 20. By the thread on the end portions 161 of the supporting components 16 and a plurality of second connecting components 202 of the lower plate 20, the supporting components 16, the fixing sheets 11 and the lower plate 20 are fixed with each other. In addition, the heat transferring device 2 further includes a plurality of guiding components 22. The guiding components 22 can be disposed on the lower plate 20 according to the practical requirements, so that the gas storage canister 3 is guided by the guiding components 22, smoothly inserted to the quick connector 21 (as shown in FIGS. 7A and 7B) and is positioned. Then, the lower plate 20 further includes a through hole 204 and a through hole 205. The input end 12 and the output end 13 protruded from the two sides of the heat transferring component 10 are respectively passed through the through hole 204 and the through hole 205 on the lower plate 20 and are protruded from the through hole 204 and the through hole 205. It should be noted that the through hole 204 and the through hole 205 can be enlarged and integrated as a single hole. Thereafter, the heat transferring device 2 further includes a positioning component 15, a carrying plate 26 and an upper plate 23. The positioning component 15 is disposed on an exterior of the heat transferring component 10 and among the supporting components 16. The carrying plate 26 includes a plurality of through holes 261. The upper plate 23 includes a plurality of through holes 231 and a plurality of second connecting components 232. The end portions 162 of the supporting components 16 are passed through the fixing sheets 11 disposed on an upper side of the heat transferring component 10, and then sequentially passed through the through holes 261 of the carrying plate 26 and the through holes 231 of the upper plate 23 and connected to the second connecting components 232. In this embodiment, the fixing sheets 11, the carrying plate 26 and the upper plate 23 are sequentially stacked, but not limited thereto. In another embodiment, the fixing sheets 11 are disposed between the carrying plate 26 and the upper plate 23. By the thread on the end portions 162 of the supporting components 16 and the second connecting components 232, the supporting components 16, the fixing sheets 11, the carrying plate 26 and the upper plate 23 are fixed with each other. Furthermore, the heat transferring device 2 further includes a scraper plate 24 and a pressing plate 25 used for pressing the scraper plate 24. The scraper plate 24 includes a plurality of recessed holes 241. The pressing plate 25 includes a plurality of through holes 251 and a plurality of second connecting components 252. The scraper plate 24 and the pressing plate 25 are sequentially disposed on a top of the upper plate 23 and the thread of the end portions 162 of the supporting components 16. Then, the second connecting components 252 are connected to the end portions 162, so that the upper plate 23, the scraper plate 24, the pressing plate 25 and the supporting components 16 are connected to each other. Finally, the heat transferring device 2 further includes an upper plate component 27 and a lower plate component 28. The upper plate component 27 includes a plurality of first connecting components 271. The lower plate component 28 includes a plurality of first connecting components 281. The upper plate component 27 and the lower plate component 28 are connected to the upper plate 23 and the lower plate 20 through the first connecting components 271 and the first connecting components 281 thereof, respectively. In this embodiment, the carrying plate 26 includes a perforation 262. The upper plate 23 includes a second perforation 233. The scraper plate 24 includes a perforation 242. The pressing plate 25 includes second connecting components 252. The gas storage canister 3 is allowed to pass through the perforation 262, the second perforation 233, the perforation 242 and the second connecting components 252 and connect to the quick connector 21. If it is necessary, the guiding components 22, the scraper plate 24, the pressing plate 25 and the carrying plate 26 can be omitted, or the second connecting components 252 can be directly fixed on the scraper plate 24 without the pressing plate 25. In addition, the positioning component 15 is used to restrict the shape and the position of the heat transferring component 10 and can be a tubular object, such as one selected from the group consisting of plastic pipes (including polyethylene pipe, polypropylene pipe, polyvinyl chloride pipe, nylon pipe, Teflon pipe), paper pipe, metal pipe (including aluminum pipe, copper pipe or stainless-steel pipe), etc., or can be made of canvas, thick film or plastic film. When the positioning component 15 is a plastic pipe, the heat loss can be reduced. On the other hand, when the positioning component 15 is a metal pipe, the rate of dissipating and removing the heat is accelerated.

Figure 6:
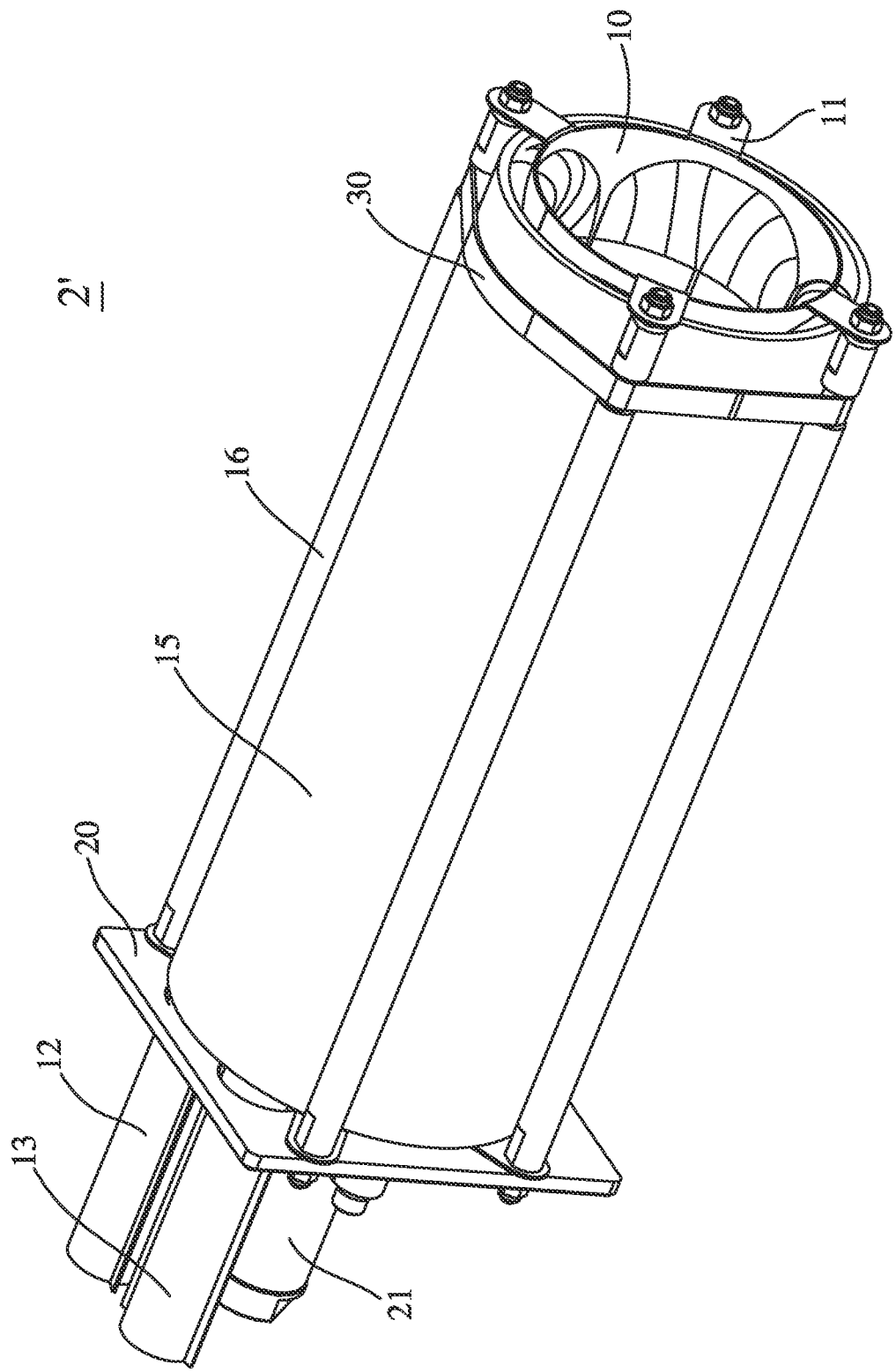
FIG. 6 is a schematic perspective view illustrating a heat transferring device according to a second embodiment of the present invention.

FIG. 6 is a schematic perspective view illustrating a heat transferring device 2' according to a second embodiment of the present invention. Meanwhile, please refer to FIG. 5. The same components are notated by the same numerals. In other words, the components with the same numeral represents the components in different embodiments have the same structure. This representation method of numerals is also applied in the following figures. Therefore, there will not be redundant descriptions thereafter. In comparison with the first embodiment shown in FIG. 5, in this embodiment, the upper plate 23, the scraper plate 24, the pressing plate 25, the carrying plate 26, the upper plate component 27 and the lower plate component 28 are omitted. Instead, the fixing sheets 11 of the heat transferring component 10 are directly connected to the end portions 161, 162 of the supporting components 16. In this embodiment, the heat transferring device 2' further includes a buckle 30. The buckle 30 can be surrounding and connected to an end of the end portions 161 or the end portions 162 according to the practical requirements. Thereby, the heat transferring device 2' can be more simply arranged in an exterior application device. Consequently, the cost is saved.

FIGS. 7A and 7B are schematic perspective views illustrating the gas storage canister 3 utilized in the present invention. The gas storage canister 3 can be designed in different shapes according to the practical requirements. In this embodiment, preferably but not exclusively, the gas storage canister 3 includes a safety valve, a handle 31, a connecting end 32 and positioning ring 33, and is substantially a metal cylinder so as to be used as a hydrogen storage canister. The safety valve and the handle 31 are disposed on an end of the gas storage canister 3, and the connecting end 32 is disposed on the other end of the gas storage canister 3. The positioning ring 33 is disposed on the connecting end 32 and includes two convex ribs 34.

Figure 8:
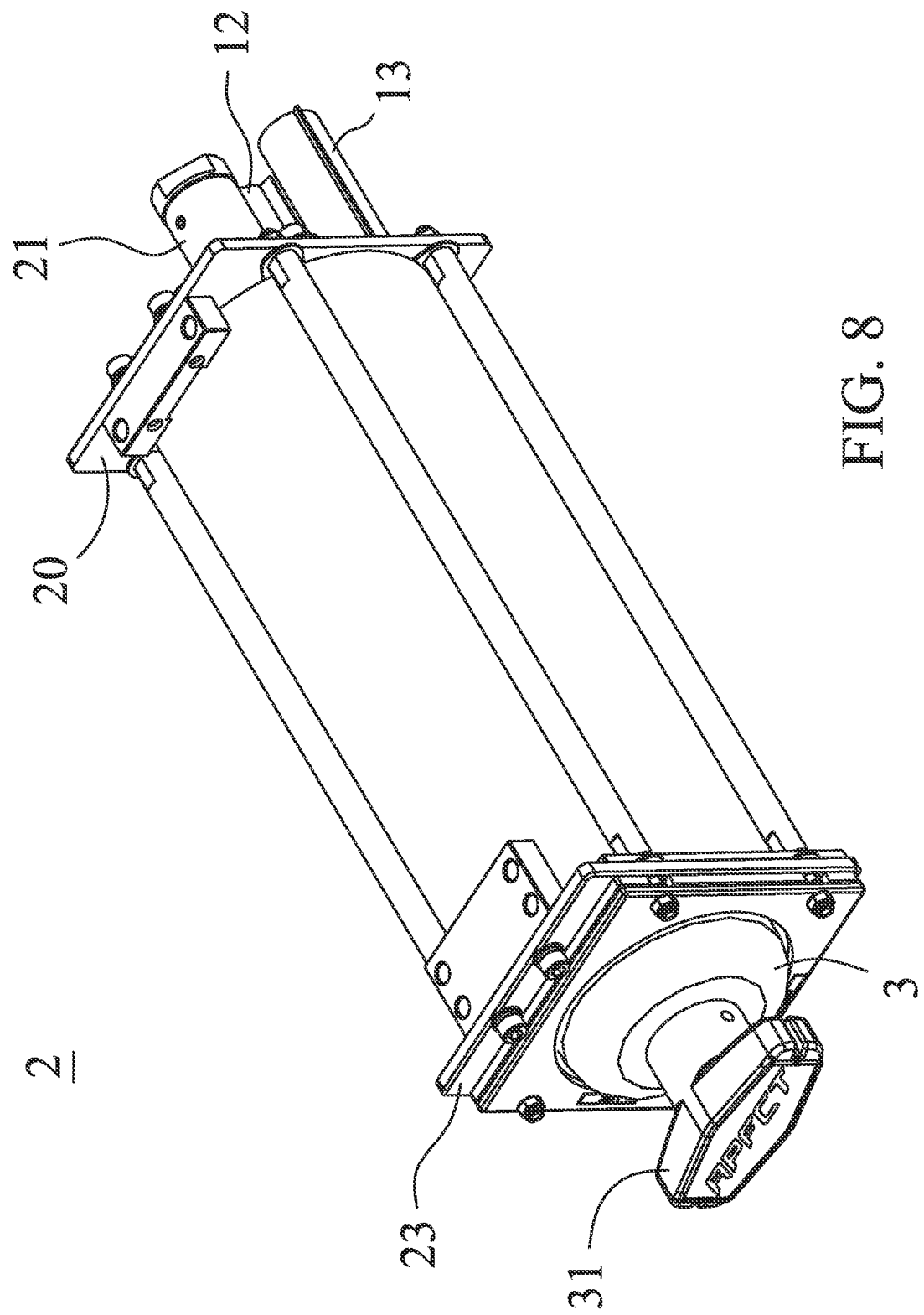
FIG. 8 is a schematic perspective view illustrating the combination structure of the heat transferring device according to the first embodiment of the present invention and the gas storage canister.

FIG. 8 is a schematic perspective view illustrating the combination structure of the heat transferring device 2 according to the first embodiment of the present invention and the gas storage canister 3. Meanwhile, please refer to FIGS. 4 and 5. When the gas storage canister 3 is disposed in the heat transferring device 2, the gas storage canister 3 is sequentially passed through the perforation 253 of the pressing plate 25, the perforation 242 of the scraper plate 24, the second perforation 233 of the upper plate 23, the perforation 262 of the carrying plate 26, the heat transferring component 10 and the first perforation 206 of the lower plate 20, and then is gently pressed to the bottom of the heat transferring device 2 and is connected to the quick connector 21. In this circumstance, by rotating the handle 31 in a clockwise direction, a locked state of the gas storage canister 3 and the heat transferring device 2 is achieved. On the other hand, by rotating the gas storage canister 3 in a counterclockwise direction, an unlocked state of the gas storage canister 3 and the heat transferring device 2 is achieved, and the gas storage canister 3 can be taken out from the heat transferring device 2. In this embodiment, the heat transferring device 2 can be designed according to the practically requirements. For example, the heat transferring device 2 can be connected to a gas supplying system (hydrogen source) or any hydrogen energy application device. In addition, a diameter of the second perforation 233 of the upper plate 23 is slightly greater than an outer diameter of the gas storage canister 3.

Figure 9:
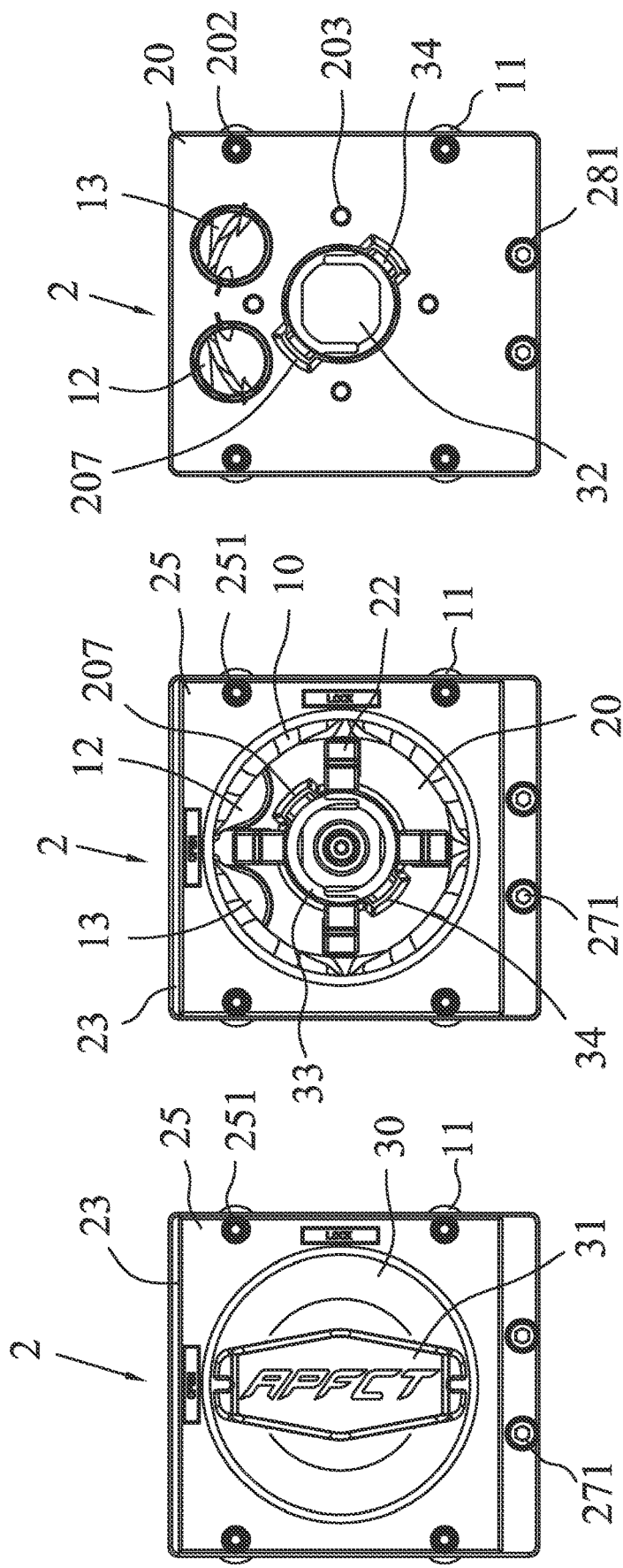
FIGS. 9A to 9C are schematic perspective views illustrating the combination structure of the heat transferring device according to the first embodiment of the present invention and the gas storage canister in an unlocked state.
Figure 10:
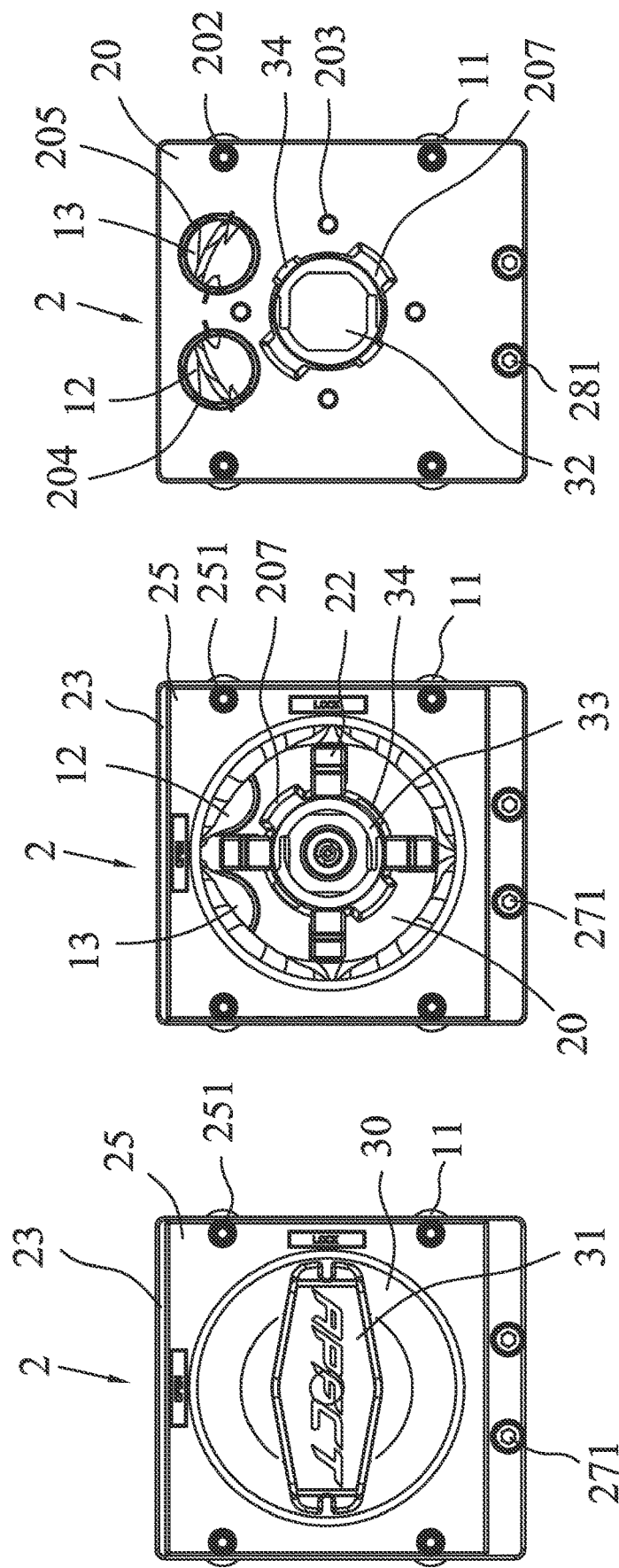
FIGS. 10A to 10C are schematic perspective views illustrating the combination structure of the heat transferring device according to the first embodiment of the present invention and the gas storage canister in a locked state.

FIGS. 9A to 9C are schematic perspective views illustrating the combination structure of the heat transferring device 2 and the gas storage canister 3 in the unlocked state. FIGS. 10A to 10C are schematic perspective views illustrating the combination structure of the heat transferring device 2 and the gas storage canister 3 in the locked state. For the ease of understanding how the gas storage canister 3 is fixed in the heat transferring device 2, the main body and the handle 31 of the gas storage canister 3 are concealed in the figures. Please refer to FIGS. 4, 7A and 7B in the meantime. The inner structures of the heat transferring device 2 combined with the gas storage canister 3 is clearly shown in FIG. 9B. The guiding components 22 are arranged in a cross arrangement. The first perforation 206 is disposed on the center of the lower plate 20, so that the gas storage canister 3 can be connected to the quick connector 21. Additionally, the diameter of the first perforation 206 exactly allows the positioning ring 33 of the gas storage canister 3 to pass therethrough. A plurality of positioning grooves 207 are disposed on two sides of the first perforation 206. When the gas storage canister 3 is inserted in the heat transferring device 2, the convex ribs 34 on the positioning ring 33 of the connecting end 32 can pass through the positioning grooves 207. As a result, the user can smoothly insert the gas storage canister 3 to the bottom of the heat transferring device 2 and connect the gas storage canister 3 to the quick connector 21. Thereafter, the handle 31 on the gas storage canister 3 is rotated 90 degrees in the clockwise direction, and the gas storage canister 3 is firmly fixed in the heat transferring device 2. More specifically, the convex ribs 34 on the positioning ring 33 of the connecting end 32, which are originally located in the positioning grooves 207, are fastened on an outer side of the lower plate 20 owing to the pressing and the rotation of the gas storage canister 3. Meanwhile, an inner spring (not shown) of the quick connector 21 presses and abuts the gas storage canister 3. Consequently, the gas storage canister 3 is firmly fixed with the heat transferring device 2 and is not easily loose, as shown in FIGS. 10B and 10C. The rotation degree of the gas storage canister 3 is not limited to 90 degrees and can be adjusted according to the practical requirements. As long as the convex ribs 34 can be partially or completely misaligned with the positioning grooves 207, the gas storage canister 3 can be fixed with the heat transferring device 2. When the heat transferring device 2 is connected to the exterior application device, e.g., fuel cell vehicle, fuel cell system, cold-water machine, thermostat, hydrogen charging system, etc., and the exterior application device is operating, the thermal conductive fluid of the exterior application device can be directed to the input end 12 of the heat transferring component 10 and fills the flow channel 14. Thereby, the pouch of the heat transferring component 10 is swelled and abuts the gas storage canister 3, so that the gas storage canister 3 is held by a clamping force.

Figure 11:
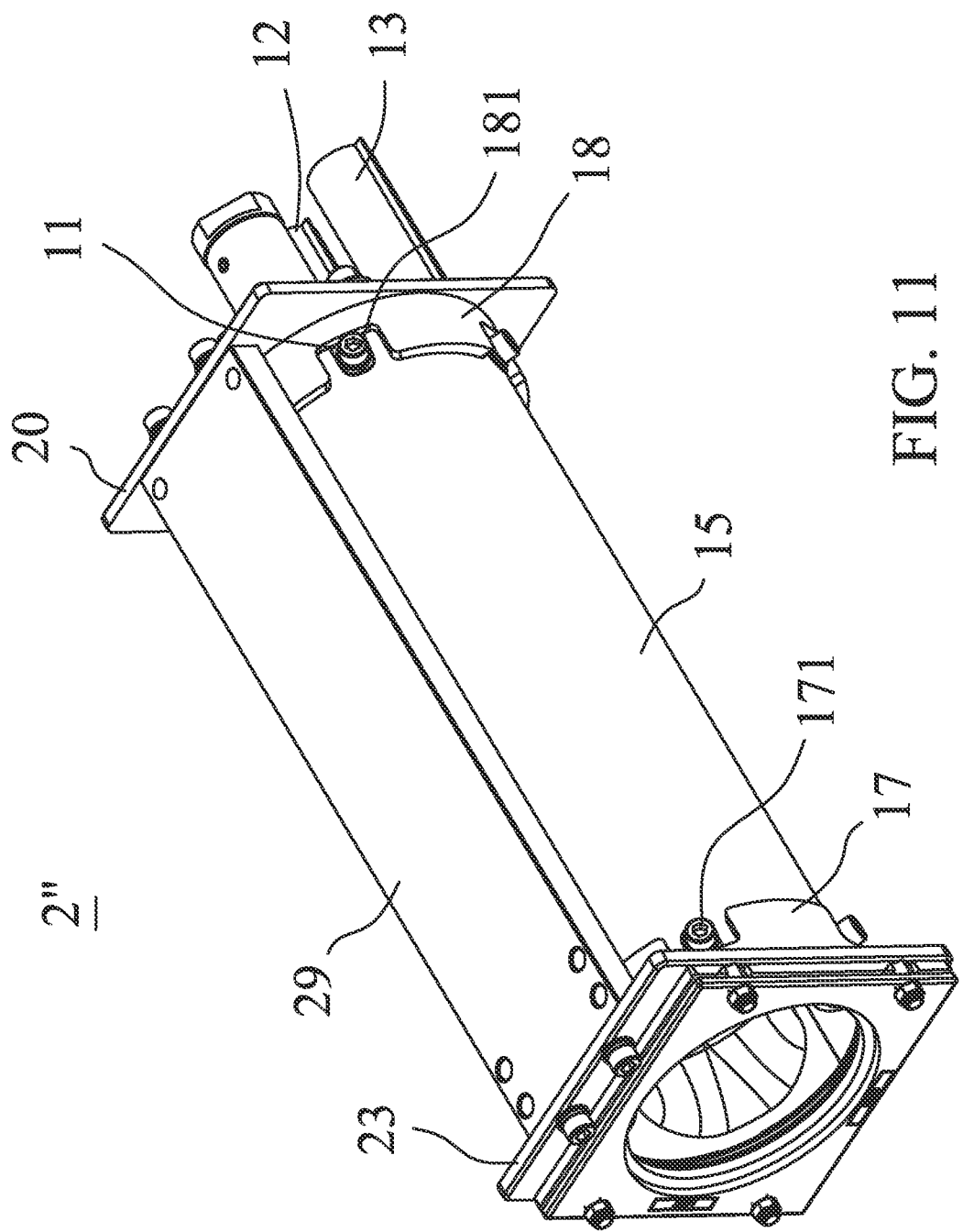
FIG. 11 is a schematic perspective view illustrating a heat transferring device according to a third embodiment of the present invention.

FIG. 11 is a schematic perspective view illustrating the heat transferring device 2 according to a third embodiment of the present invention. In comparison with the first embodiment shown in FIG. 5, in this embodiment, the supporting components 16 is omitted and replaced by a fixing component 17 and a fixing component 18 in the heat transferring device 2". The fixing component 17 and the fixing component 18 are annular, are respectively disposed on a top and a bottom of the heat transferring device 2" and are connected to the positioning component 15, the upper plate 23 and the lower plate 20. In this embodiment, the fixing component 17 and the fixing component 18 can be connected to the positioning component 15, the upper plate 23 and the lower plate 20 by any method such as gluing, screwing, riveting, buckling, or bonding. A plate component 29 is used for connected between the upper plate 23 and the lower plate 20, so that the upper plate 23 and the lower plate 20 are fixed with each other. The number of the plate component 29 can be increased according to the requirements. The fixing sheets 11 on the upper side and the lower side of the heat transferring component 10 are fixed on the positioning component 15 through a plurality of first connecting components 171 and a plurality of first connecting components 181, respectively. If it is necessary, the fixing component 17 and the fixing component 18 can be omitted, and the positioning component 15 is directly connected to the upper plate 23 and the lower plate 20, respectively.

Figure 12:
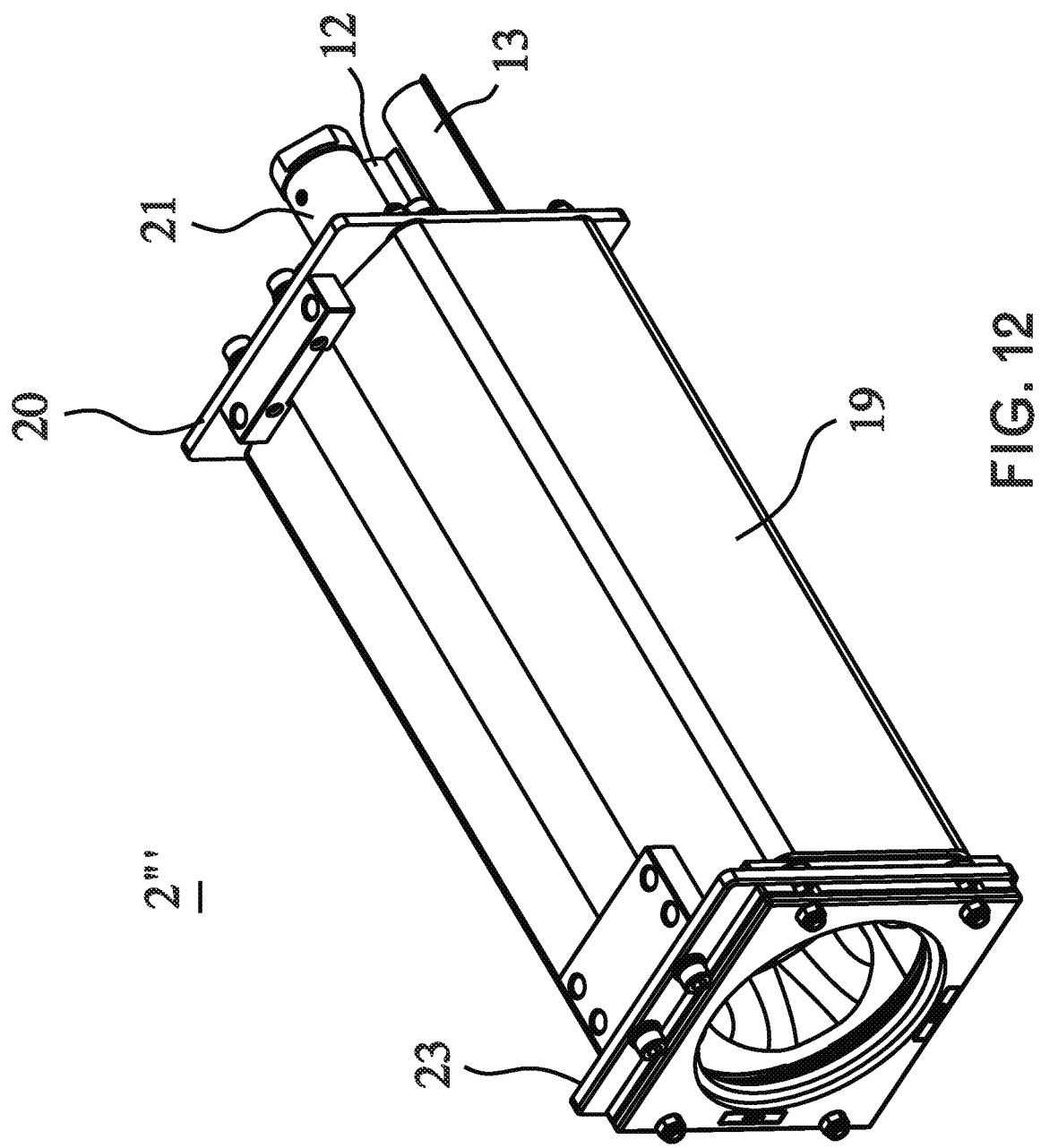
FIG. 12 is a schematic perspective view illustrating a heat transferring device according to a fourth embodiment of the present invention.

FIG. 12 is a schematic perspective view illustrating a heat transferring device 2''' according to a fourth embodiment of the present invention. In comparison with the first embodiment shown in FIG. 5, in this embodiment, the tubular positioning component 15 is replaced by a positioning component 19 with a profile of prism. The positioning component 19 surrounds and wraps up the supporting components 16 and is composed of canvas, thick film, plastic film, breathable materials or impermeable materials. The material of the positioning component 19 is determined according to the practical requirements.

Figure 13:
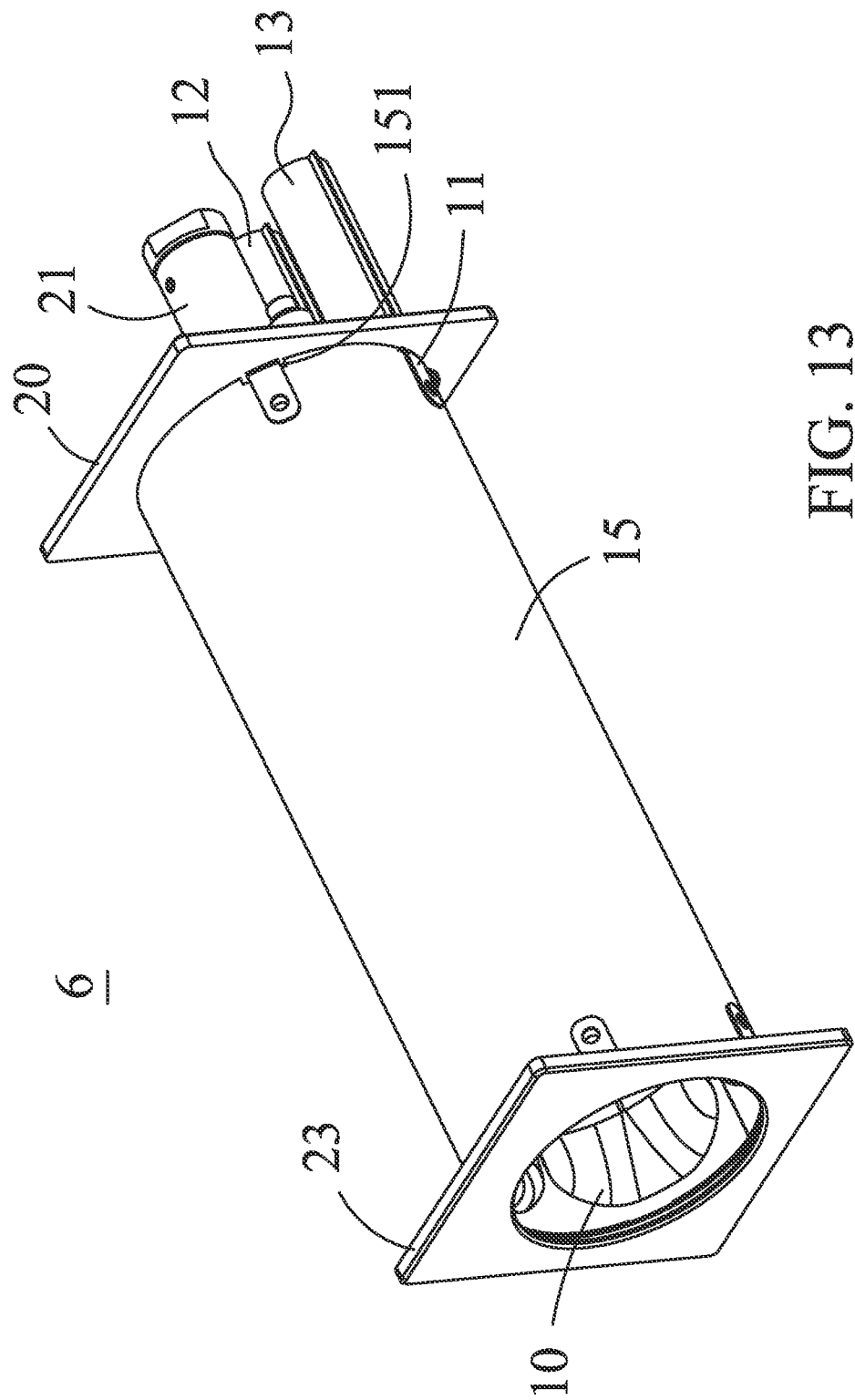
FIG. 13 is a schematic perspective view illustrating a heat transferring device according to a fifth embodiment of the present invention.

FIG. 13 is a schematic perspective view illustrating a heat transferring device 6 according to a fifth embodiment of the present invention. In comparison with the first embodiment shown in FIG. 5, in this embodiment, the supporting components 16, the scraper plate 24, the pressing plate 25, the carrying plate 26, the upper plate component 27 and the lower plate component 28 are removed. The upper plate 23, the lower plate 20 and the positioning component 15 are connected to each other by tenon, fastening, screwing, binding, gluing, soldering or welding. In this embodiment, the fixing sheets 11 of the heat transferring component 10 are protruded out through a plurality of recesses 151 disposed on a periphery of the positioning component 15 and fixed by binding, gluing or screwing. Consequently, advantages of easily assembling and fixing, reducing the weight and reducing the time cost are achieved.

Figure 14:
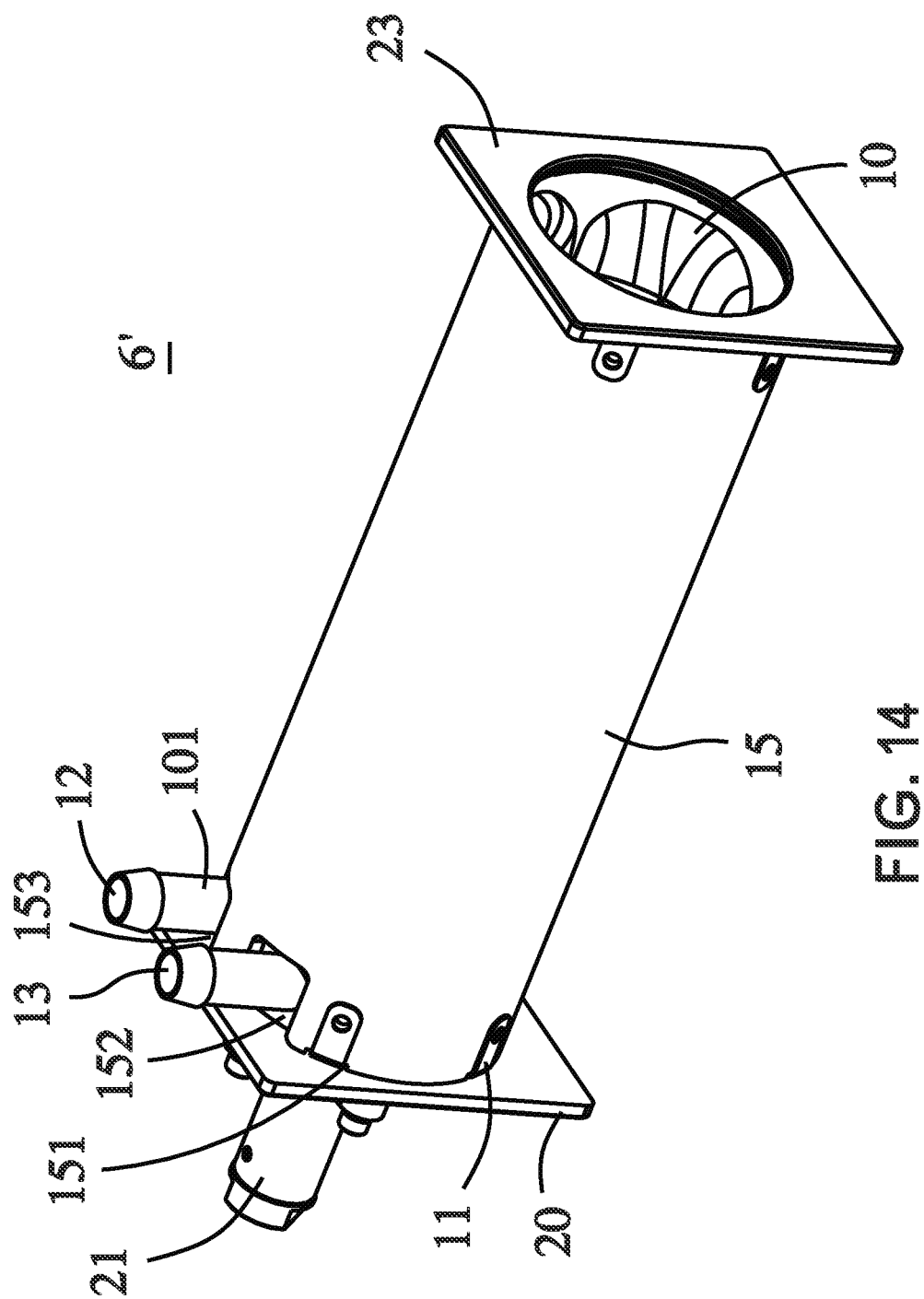
FIG. 14 is a schematic perspective view illustrating a heat transferring device according to a sixth embodiment of the present invention.

FIG. 14 is a schematic perspective view illustrating a heat transferring device 6' according to a sixth embodiment of the present invention. In comparison with the fifth embodiment shown in FIG. 13, the positioning component 15 further includes two through holes 152 and 153 on a proper position near to the periphery of the lower plate 20, so as to adapt to the requirement of the designing space, such as that the input end 12 and the output end 13 are needed to have a structure bent in 90 degrees. If it is necessary, the through hole 152 and the through hole 153 can be enlarged and integrated as a single hole. In this embodiment, the input end 12 and the output end 13 are sealed in advance. The portions on the proper positions corresponding to the through hole 152 and the through hole 153 on the heat transferring component 10 are cut from the side to form the through hole 152 and the through hole 153. Then, two tubes 101 compatible with the material of the heat transferring component 10 are connected to the heat transferring component 10 through an ultrasonic welding process or other process and are protruded from the positioning component 15. Consequently, the two tubes 101 are treated as the input end 12 and the output end 13 of the heat transferring component 10 and are connected to the exterior application device. On the other hand, the original through hole 204 and through hole 205 of the lower plate 20 in the previous embodiments can be sealed, and the other structures are not changed.

Figure 15:
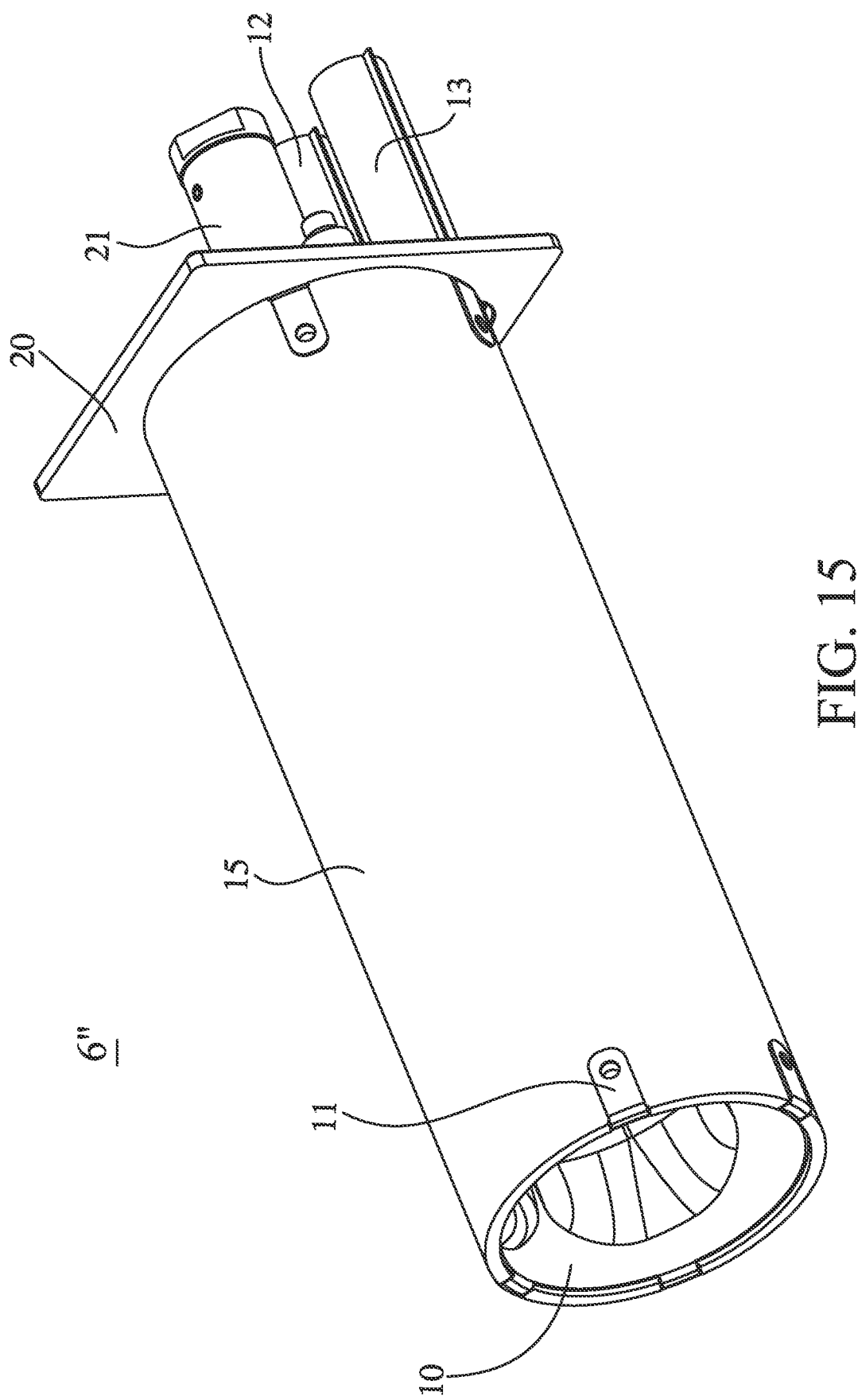
FIG. 15 is a schematic perspective view illustrating a heat transferring device according to a seventh embodiment of the present invention.

FIG. 15 is a schematic perspective view illustrating a heat transferring device 6" according to a seventh embodiment of the present invention. In comparison with the fifth embodiment shown in FIG. 13, in this embodiment, the upper plate 23 is omitted. Instead, the fixing sheets 11 of the heat transferring component 10 are connected to the periphery of the positioning component 15 and fixed thereon by binding, gluing or screwing. Consequently, the heat transferring device 6" can be more easily assembled, and the cost is saved.

Figure 16:
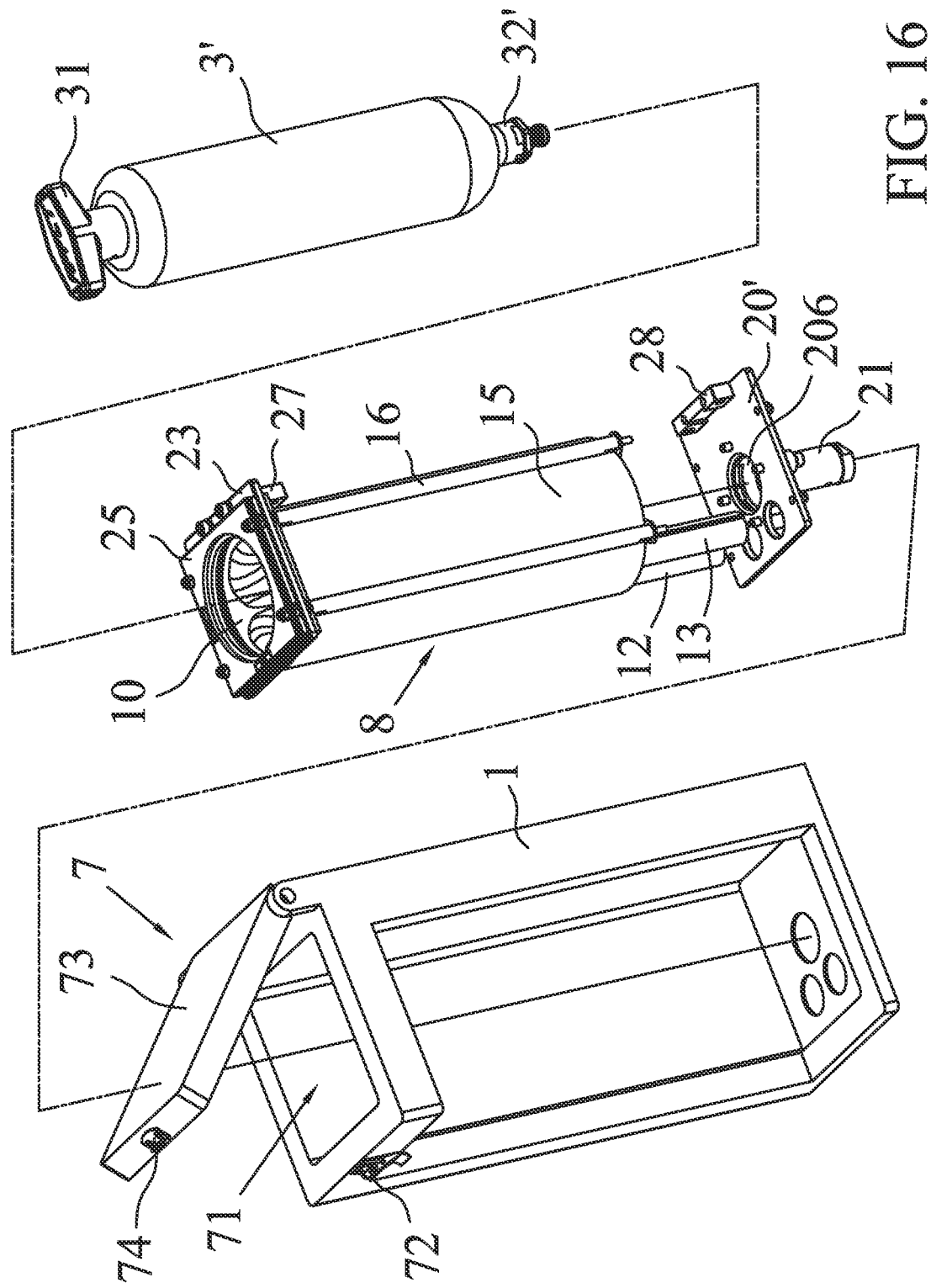
FIG. 16 is a partial exploded view illustrating a heat transferring device according to an eighth embodiment of the present invention and the gas storage canister.
Figure 17:
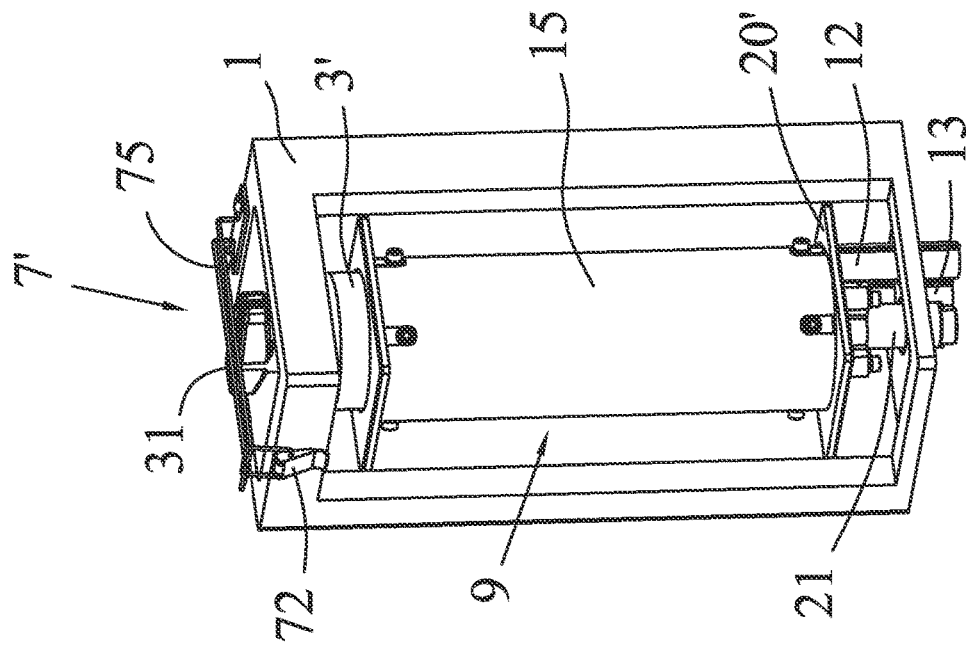
FIG. 17 is a schematic perspective view illustrating the heat transferring device according to the eighth embodiment of the present invention and the gas storage canister.
Figure 18:
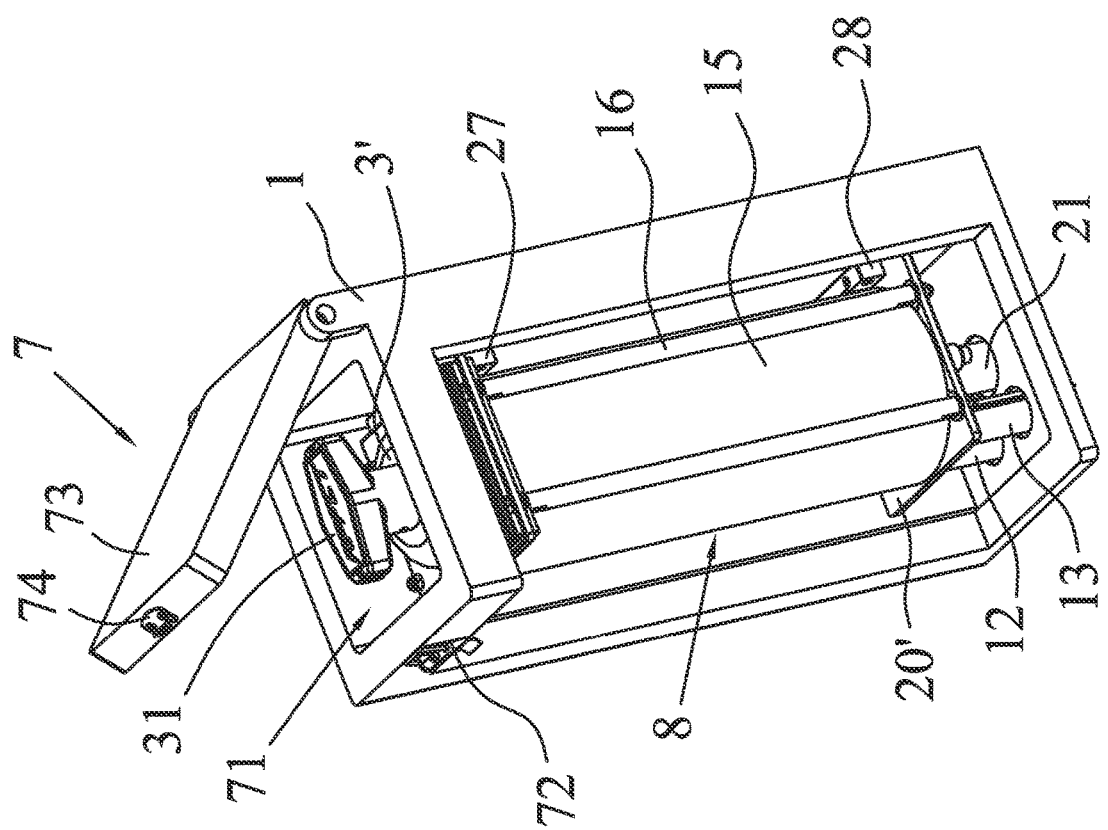
FIG. 18 is a schematic perspective view illustrating a heat transferring device according to a ninth embodiment of the present invention and the gas storage canister.

FIGS. 16 and 17 are a partial exploded view and a schematic perspective view illustrating a heat transferring device 8 according to an eighth embodiment of the present invention and the gas storage canister 3'. FIG. 18 is the schematic perspective view illustrating a heat transferring device 9 according to a ninth embodiment of the present invention and the gas storage canister 3'. In comparison with the first embodiment shown in FIG. 4, in the eighth embodiment, there are no positioning grooves 207 and guiding components 22 disposed on the periphery of the first perforation 206 disposed on the center of the lower plate 20'. In comparison with the first embodiment shown in FIG. 4, in the ninth embodiment, the heat transferring device 9 does not include the supporting components 16, the scraper plate 24, the pressing plate 25, the carrying plate 26, the upper plate component 27, the lower plate component 28, the positioning grooves 207 and the guiding components 22. Such designs are used for allowing the gas storage canister 3', which the connecting end 32' thereof does not include the positioning ring 33 and the convex rib 34, to adapt to the heat transferring device of the present invention. That is, the combination between the gas storage canister 3' and the quick connector 21 is no longer achieved by the fastening between the convex rib 34 and the positioning grooves 207. In these embodiments, a clamping portion 7, 7' is disposed on an exterior of the application device 1, and the heat transferring device 8, 9 is disposed below the clamping portion 7, 7'. For example, the clamping portion 7 includes a hollowing portion 71, a buckle 72, a cover 73 and a fastening portion 74. The hollowing portion 71 is formed on a surface of the application device 1 and allows the gas storage canister 3' to pass therethrough. The buckle 72 is disposed on a side of the application device 1 and is adjacent to the hollowing portion 71. The cover 73 is connected to the application device 1 and is spatially located over the hollowing portion 71. The fastening portion 74 is disposed on a side of the cover 73. When the gas storage canister 3' is inserted into the heat transferring device 8, 9, since there is no convex rib 34, it is no need to rotate the gas storage canister 3'. After the gas storage canister 3' is inserted to the bottom of the heat transferring device 8, 9, the cover 73 of the clamping portion 7 is forced to cover on the gas storage canister 3' and is fastened. By the pressing force of the clamping portion 7, the gas storage canister 3' and the quick connector 21 is firmly connected to each other. The clamping portion 7 mentioned above is not limited to consist of the frame and the cover 73 and can be any combination of the different shapes and fastening methods. The shapes are such as square shape, long-strip shape, linear shape, round shape, regular shape, irregular shape or other similar shape, and the fastening methods are exemplar pneumatic means, hydraulic means, clamping means, tenons or latches. The combination of the shape and the fastening method is utilized as long as the gas storage canister 3' can be pressed and maintained at a fixing position, and can be firmly connected to the quick connector 21. For example, in the ninth embodiment shown in FIG. 18, the clamping portion 7' includes a buckle 72 and a steel ring 75 and is spatially located on a center line of the positioning component 15. By the connection between the steel ring 75 having flexibility and the buckle 72, the handle 31 of the gas storage canister 3' can be firmly pressed, and the detachment of the gas storage canister 3' can be prevented. Accordingly, it can be understood that the heat transferring device 2, 2", 2"', 6, 6' shown in FIGS. 5, 11, 12, 13 and 14 can also adapt to the application device 1 with the clamping portion 7, 7' and the gas storage canister 3' without the positioning ring 33.

Figure 19:
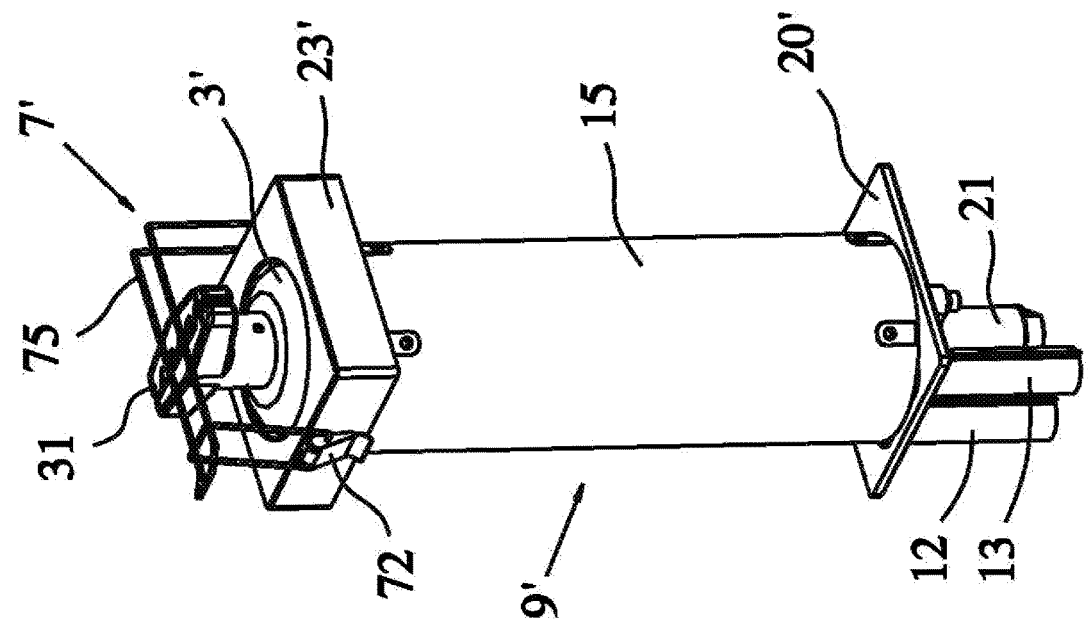
FIG. 19 is a schematic perspective view illustrating a heat transferring device according to a tenth embodiment of the present invention and the gas storage canister.

FIG. 19 is a schematic perspective view illustrating a heat transferring device 9' according to a tenth embodiment of the present invention and the gas storage canister 3'. In comparison with the fifth embodiment shown in FIG. 13 and the ninth embodiment shown in FIG. 18, the upper plate 23' in this embodiment includes a periphery portion. The clamping portion 7' including the flexible steel ring 75 and the buckle 72 mentioned above can be utilized on the periphery portion of the upper plate 23'. Thereby, the heat transferring device 9' is not restricted by the casing of the application device 1 and can be an independent device adapting to any of the gas storage canisters 3, 3'. Consequently, the using convenience is improved.

Figure 20A:
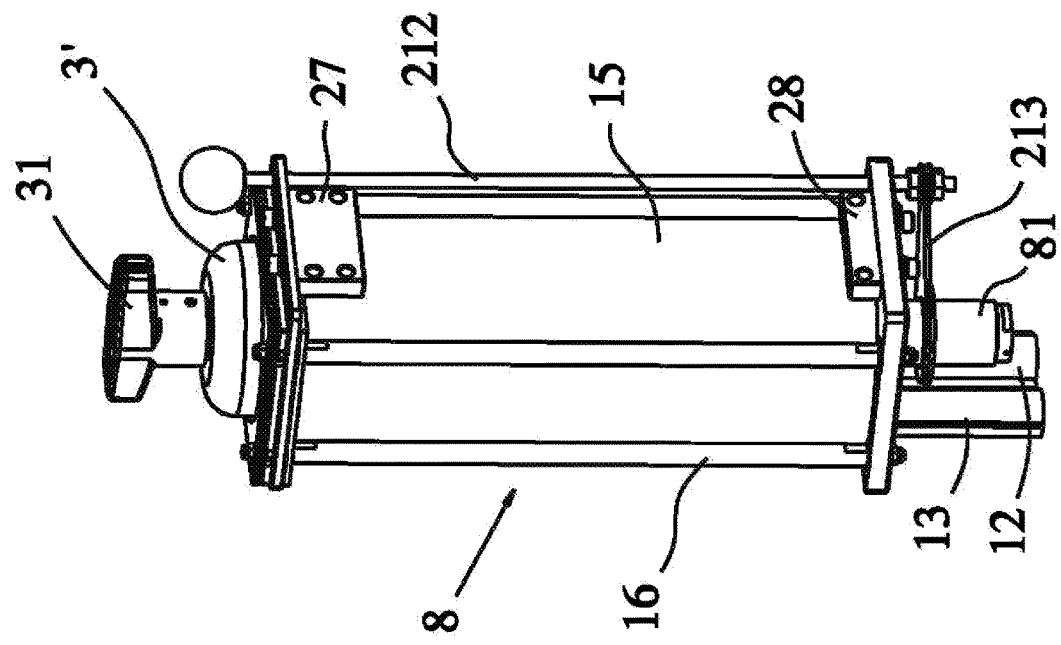
FIGS. 20A to 20C are schematic perspective views illustrating the devices consisting of the heat transferring device and the gas storage canister of the present invention with different quick connectors.
Figure 20C:
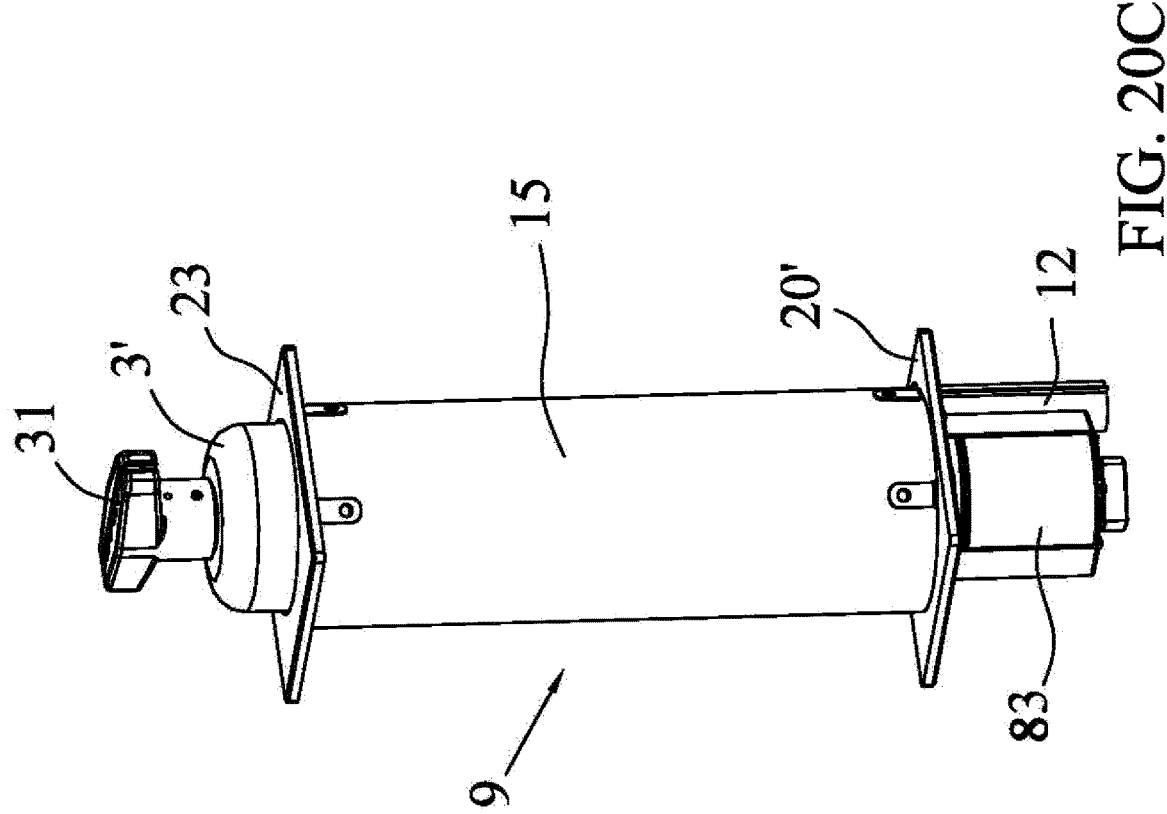
Figure 20B:
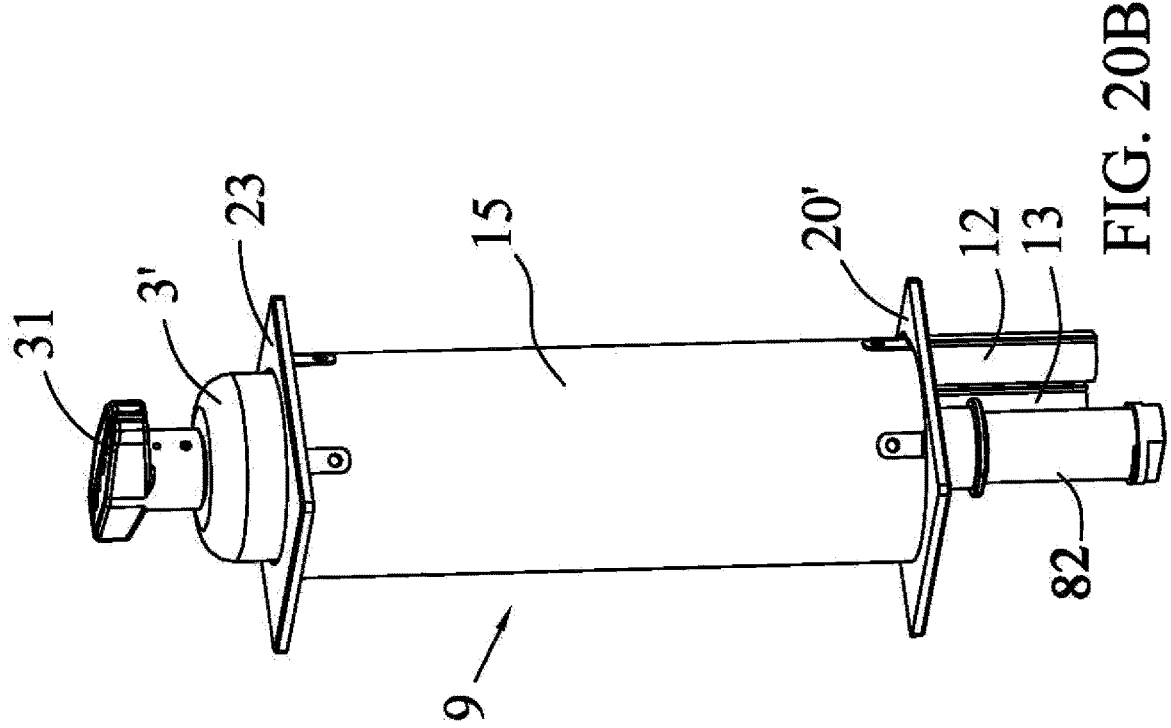

FIGS. 20A to 20C are schematic perspective views illustrating the devices consisting of the heat transferring device 8, 9 and the gas storage canister 3' of the present invention with different quick connectors 81, 82, 83. First, FIG. 20A is the schematic perspective view illustrating the combination of the heat transferring device 8 and a quick connector 81 with a steel-ball-containing structure. In this embodiment, the gas storage canister 3' is inserted to the bottom of the heat transferring device 8 and is locked and restricted by the steel ball inside the quick connector 81, and the steel ball is connected to a pushing rod 212 through a third connecting component 213. When the pushing rod 212 is pushed, the connecting end 32' of the gas storage canister 3' can be released from the restriction of the steel ball owing to the connection between the steel ball, the third connecting component 213 and the pushing rod 212. Then, the gas storage canister 3' can be taken out from the heat transferring device 8. Second, FIG. 20B is the schematic perspective view illustrating the combination of the heat transferring device 9 and a quick connector 82 with a pop-up structure. More specifically, when the gas storage canister 3' is inserted to the bottom of the heat transferring device 9, the gas storage canister 3' is locked by the quick connector 82. Thereafter, by further pressing down the gas storage canister 3', the gas storage canister 3' is unlocked and popped up. Furthermore, FIG. 20C is the schematic perspective view illustrating the combination of the heat transferring device 9 and a quick connector 83 with an electromagnetic structure. In this embodiment, when the gas storage canister 3' is inserted to the bottom of the heat transferring device 9, the connecting end 32' is locked owing to the excitation of the quick connector 83. Thereafter, when the quick connector 83 is demagnetized, the connecting end 32' is unlocked and can be taken out. In some other embodiments, the gas storage canister 3' is directly locked when being inserted to the bottom of the heat transferring device 9, and thereafter is unlocked through exciting or demagnetizing the quick connector 83.

When the heat transferring device 2, 2', 2", 2"', 6, 6', 6", 8, 9, 9' mentioned above is combined with the application device 1, such as hydrogen energy electric scooter, hydrogen energy generator, hydrogen energy vehicle, hydrogen energy stacker, the gas storage canister 3, 3' is inserted in the interior of the heat transferring device 2, 2', 2", 2"', 6, 6', 6", 8, 9, 9' and is connected to the quick connector 21, 81, 82, 83. Thereby, the surface of the gas storage canister 3, 3' is tightly contacted with the heat transferring component 10 therein. Then, the input end 12 and the output end 13 of the heat transferring component 10 are connected to a circulation pipeline of the fluid (not shown, such as the circulation pipeline of the fluid of the fuel cell). By the heat provided through the thermal conductive fluid and the heat conduction, the hydrogen storage material inside the gas storage canister 3, 3' absorbs the heat and releases the hydrogen gas for the application device 1. On the other hand, the heat transferring device 2, 2', 2", 2"', 6, 6', 6", 8, 9, 9' can also be utilized in a hydrogen charging system. In some embodiments, the heat transferring device 2, 2', 2", 2"', 6, 6', 6", 8, 9, 9' is disposed on the hydrogen charging system, and the quick connector 21, 81, 82, 83 is connected between the hydrogen source and the gas storage canister 3, 3'. Then, the input end 12 and the output end 13 of the heat transferring component 10 are connected to a circulation pipeline of the fluid (not shown, such as the circulation pipeline of the fluid of the cold-water machine). Through the fluid with relative-low temperature, the heat in the hydrogen storage material inside the gas storage canister 3, 3' can be conducted and dissipated. Thereby, the hydrogen gas can be charged into and fill up the gas storage canister 3, 3'. The thermal conductive fluid mentioned above can be a heat medium, a refrigerant or any fluid capable of maintaining in a flowing state, such as water, ethylene glycol, propylene glycol, a mixture of water and ethylene glycol, a mixture of water and propylene glycol, a mixture of water, ethylene glycol and propylene glycol, or a liquid with a temperature between 3° C. and 95° C., etc.

Figure 21A:
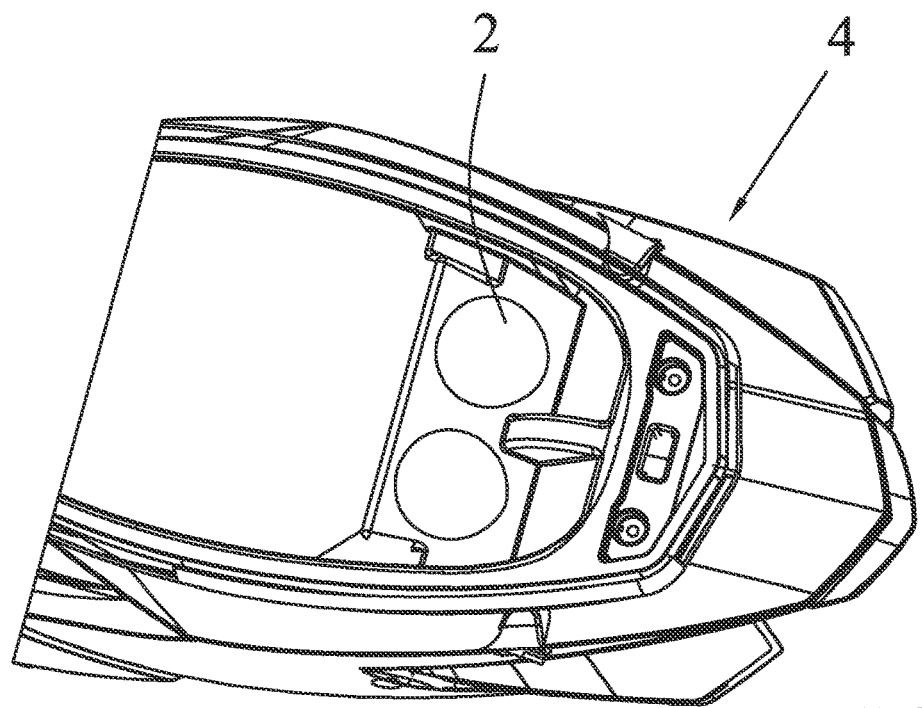
FIGS. 21A and 21B are schematic perspective views illustrating the heat transferring device and the gas storage canister of the present invention disposed in a fuel cell electric scooter.
Figure 21B:
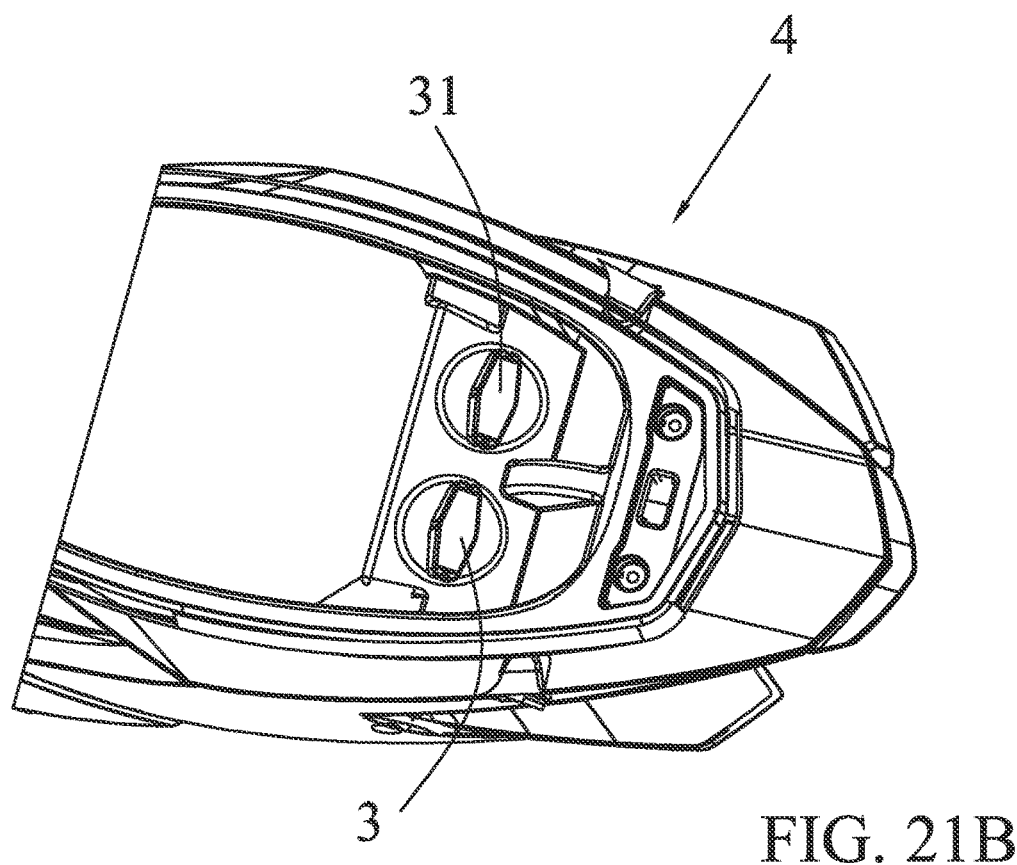

FIGS. 21A and 21B are schematic perspective views illustrating the heat transferring device 2 and the gas storage canister 3, 3' of the present invention disposed in a fuel cell electric scooter 4. As shown in FIG. 21A, two sets of the heat transferring devices 2 are designed to be disposed in the system of the fuel cell electric scooter 4. In this embodiment, the heat transferring devices 2 are disposed under the cushion of the electric scooter 4. The gas storage canisters 3, 3' filled with hydrogen gas are inserted in (and rotated as necessary) the heat transferring devices 2, respectively, as shown in FIG. 21B. Thereby, the electric scooter 4 can be enabled and be operated. When the electric scooter 4 is driven, the heat generated during the operation of the fuel cell and the cooling water for the heat dissipating circulation are regarded as the heat source and the thermal conductive fluid for the heat transferring devices 2, respectively. By connecting the input end 12 and the output end 13 of the heat transferring component 10 with the circulation pipeline of the cooling water of the fuel cell, the gas storage canisters 3, 3' are heated, and the hydrogen storage materials therein release the hydrogen gas. Simultaneously, the temperature of the cooling water is reduced. Consequently, a beneficial circulation is formed, and the purpose of saving energy is achieved.

Figure 23:
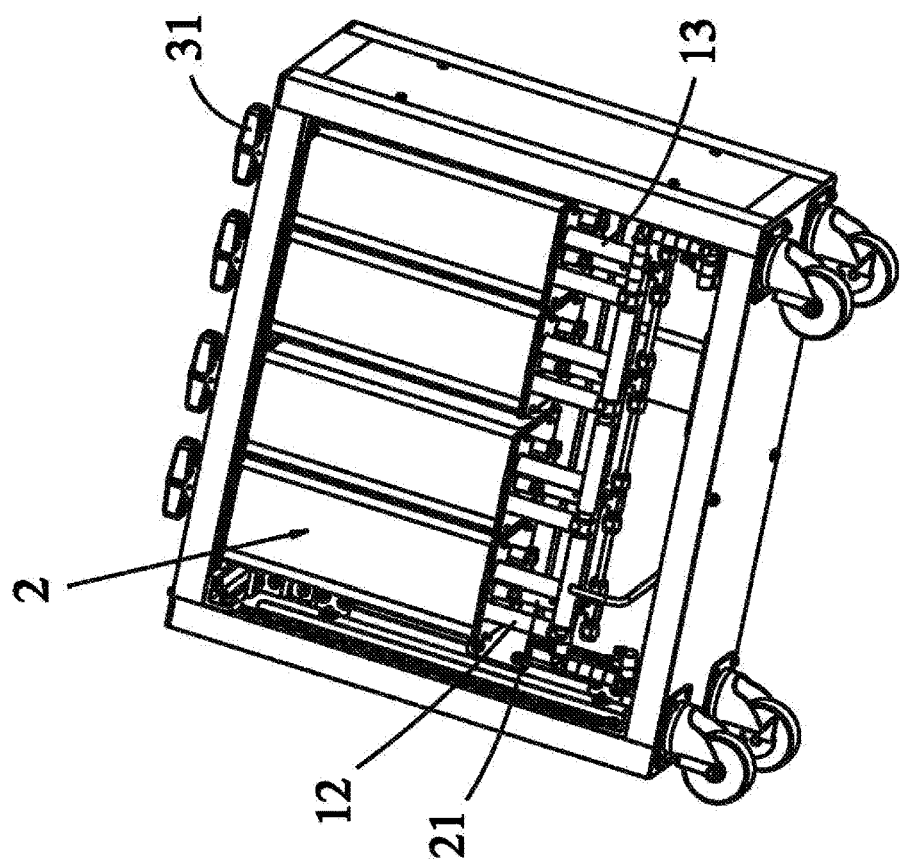
FIG. 23 is a schematic perspective view illustrating an embodiment that multiple sets of the device of the present invention are connected to be applied.
Figure 22:
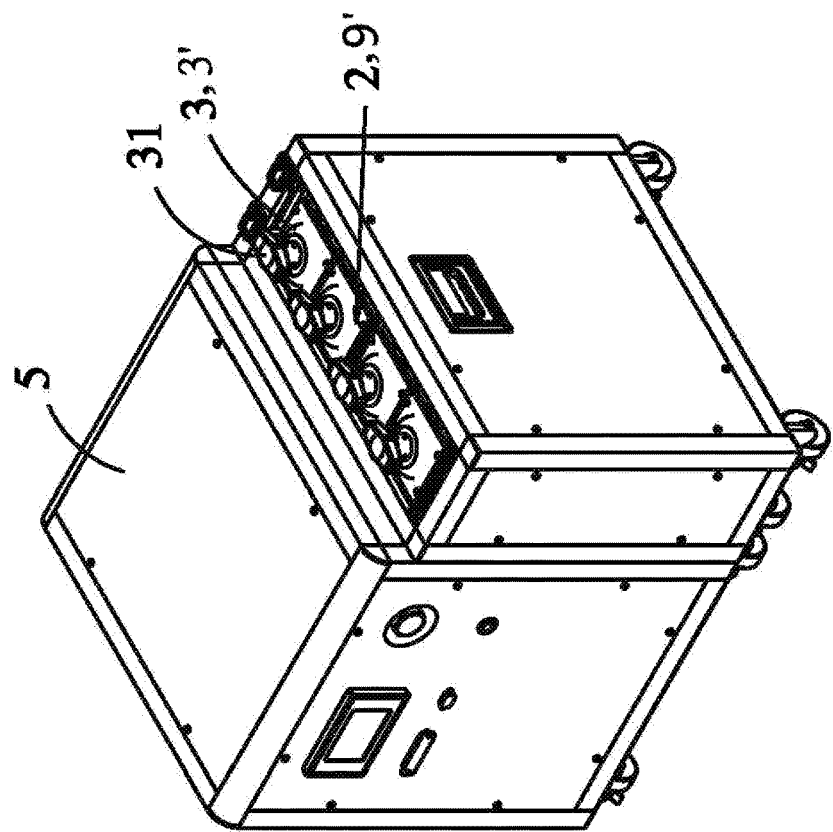
FIG. 22 is a schematic perspective view illustrating the heat transferring device and the gas storage canister of the present invention disposed in a fuel cell power generator.

FIG. 22 is a schematic perspective view illustrating the heat transferring device 2 and the gas storage canister 3 of the present invention disposed in a fuel cell power generator 5. As shown in FIG. 22, four sets of the heat transferring devices 2, 2', 2'', 2''', 6, 6', 6'', 8, 9, 9' and the gas storage canisters 3, 3' filled with hydrogen gas are disposed on a side of the power generator system 5. The gas storage canisters 3, 3' are inserted in (and rotated as necessary) the heat transferring devices 2. The input ends 12 and the output ends 13 of the heat transferring components 10 of the heat transferring device 2 and ends of the quick connectors 21 are connected to each other. In that, an application that multiple sets of the heat transferring device 2 connected with each other is achieved, as shown in FIG. 23. In addition, the cooling water with high temperature generated due to the operation of the power generator system 5 is used as a heat source for the heat transferring devices 2, 2', 2'', 2''', 6, 6', 6'', 8, 9, 9'. By regarding the water as heat medium, the circulation pipeline of the cooling water is connected to a collaborative input of the input ends 12 and a collaborative output of the output ends 13 of the heat transferring components 10 of the heat transferring devices 2. Consequently, the power generator system 5 is capable of stably keeping the operation to supply power.

The following table is a comparison table illustrating the hydrogen storage, the residual hydrogen, the grams of hydrogen released, and the time of releasing hydrogen of the conventional heating device (the prior art hereinafter) and the heat transferring device 2 of the present invention (the present invention hereinafter).

| Type of heat transferring device | hydrogen storage (g) | residual hydrogen (g) | grams of hydrogen released (g) | time of releasing hydrogen |
|---|---|---|---|---|
| Present invention | 51.67 | 19.38 | 32.29 | 33 m 07 s |
| Prior art | 51.33 | 25.61 | 25.72 | 27 m 34 s |

The table is obtained that two gas storage canisters 3, 3' with the same specification are 51.67 grams and 51.33 grams, respectively. The two gas storage canisters 3, 3' are respectively disposed inside the present invention and the prior art. Both of the present invention and the prior art include a fluid circulation system, and the thermal conductive fluid is water. The hydrogen releasing test is performed by releasing 12 liters of hydrogen gas at 52° C., and the result is:

1. Regarding the present invention, the time of releasing hydrogen of is 33 minutes and 7 seconds, and the residual hydrogen is 19.38 grams. After calculation, the grams of hydrogen released are 32.29 grams.

2. Regarding the prior art, the time of releasing hydrogen is 27 minutes and 34 seconds, and the residual hydrogen is 25.61 grams. After calculation, the grams of hydrogen released are 25.72 grams.

Figure 24:
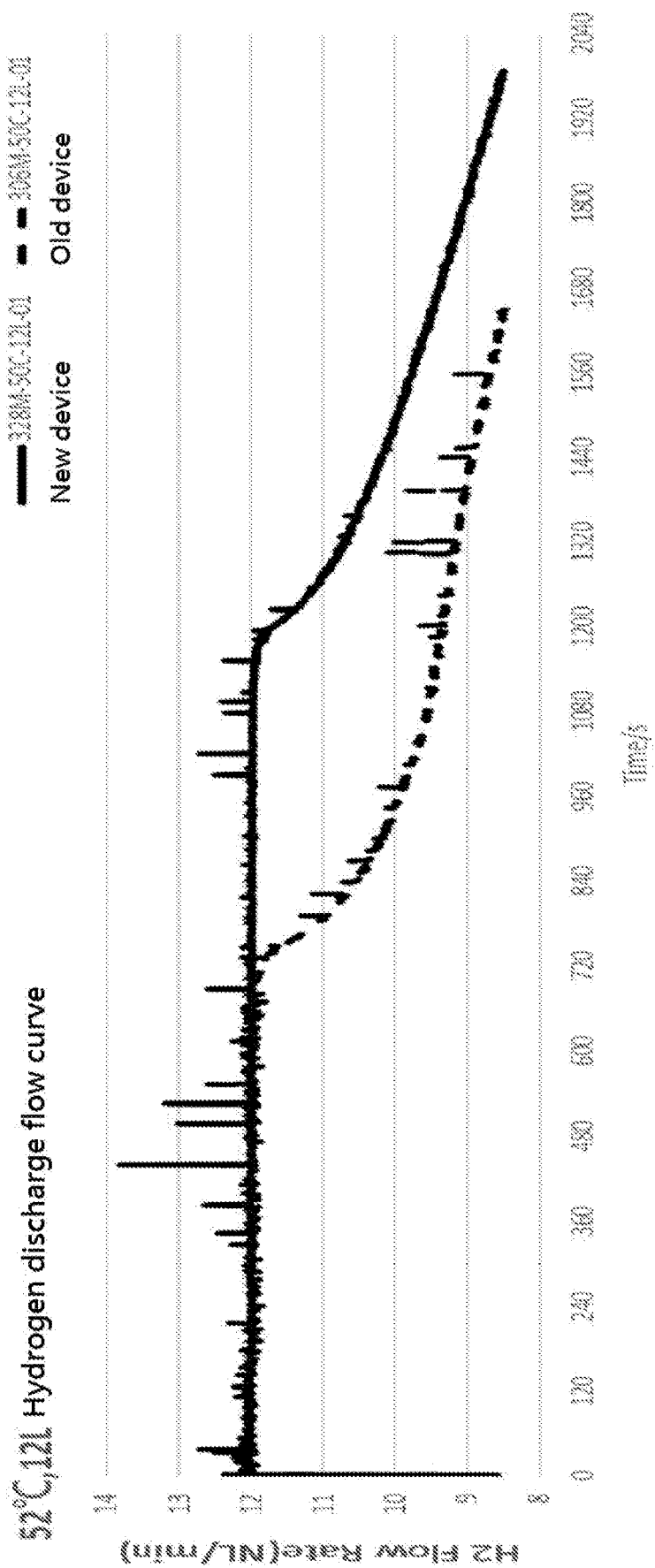
FIG. 24 is a comparison chart illustrating the curves of the hydrogen releasing flow of the devices of the present invention and the prior art.

FIG. 24 is a comparison chart illustrating the curves of the hydrogen releasing flow of the devices of the present invention and the prior art. The X-axis represents time, and the Y-axis represents flow rate. The chart is drawn according to the result of the hydrogen releasing test provided above. The time of releasing hydrogen of the present invention is 1,987 seconds, as shown by the solid line. The time of releasing hydrogen of the present invention is 1,654 seconds, as shown by the dotted line. Accordingly, the difference between the times of releasing hydrogen of the present invention and the prior art is 333 seconds. That is, the present invention is capable of extending the time of releasing hydrogen by 5 minutes and 33 seconds. It can be understood that in the hydrogen releasing test, the performance of the present invention is much better than that of the prior art. The grams of hydrogen released of the present invention is much more than that of the prior art, and the present invention further extends the time of releasing hydrogen. In conclusion, the hydrogen energy can be efficiently used. Moreover, there are efficacies of easily assembling and fixing, small volume, light weight and excellent thermal conduction efficiency in the present invention.

While the disclosure has been described in terms of what is presently considered to be the most practical and preferred embodiments, it is to be understood that the disclosure needs not be limited to the disclosed embodiment. A person skilled in the art can clearly understand that the embodiments described in the disclosure can be adjusted. The components in the embodiments can be replaced by equivalent components without deviating from the spirit and scope of the disclosure. The figures may not be drawn in accordance with the aspect ratio. An embodiment not described in the disclosure exists. The specification should be regarded as being illustrative but not restrictive. It is intended to cover various modifications and similar arrangements about conditions, materials, composes of substances, methods or manufacture processes included within the purpose, characteristic, spirit and scope of the appended claims which are to be accorded with the broadest interpretation so as to encompass all such modifications and similar structures. Although the methods disclosed herein have been described with reference to specific operations performed in a specific order, it is understood that these operations can be combined, subdivided, or reordered to form equivalents without deviating from the teachings of the disclosure. Therefore, unless there is specifical indication in the disclosure, the order of operations and the arrangement of groups are not a limitation of the disclosure.

What is claimed is:

1. A heat transferring device comprising:
a heat transferring component in a shape of pouch and comprising at least one input end and at least one output end to allow a fluid to be inputted and outputted;
a lower plate comprising at least one first perforation;
a sleeve disposed on and surrounding an exterior of the heat transferring component to restrict the shape and a position of the heat transferring component, wherein an end of the sleeve is connected to the lower plate,
an upper plate comprising at least one second perforation, wherein another end of the sleeve is connected to the upper plate; and
at least one support rod connected to the upper plate and the lower plate,
wherein the heat transferring component further comprises at least one protrusion on the periphery, and the protrusion is fixed on the support rod through at least one fastener.

2. The heat transferring device according to claim 1, wherein the heat transferring component further comprises at least one flow channel to allow the fluid to flow therein, wherein the input end of the heat transferring component is the entrance for the fluid, and the output end of the heat transferring component is the exit for the fluid.

3. The heat transferring device according to claim 1, further comprising a quick connector, wherein the lower plate further comprises at least one through hole, and the quick connector is connected to the lower plate through the through hole and is spatially corresponding to the first perforation.

4. The heat transferring device according to claim 1, wherein the lower plate or the sleeve comprises at least one through hole to allow the input end and the output end of the heat transferring component to pass therethrough and be protruded from the heat transferring component.

5. The heat transferring device according to claim 1, further comprising at least one guiding component, a scraper plate, a pressing plate, an upper plate component and a lower plate component, wherein the guiding component is disposed on the lower plate for guiding and positioning a gas storage canister, the scraper plate is connected to the upper plate, and the pressing plate is disposed on the scraper plate, wherein the upper plate component is connected to the upper plate, and the lower plate component is connected to the lower plate.

6. The heat transferring device according to claim 1, further comprising a carrying plate connected to the upper plate, and the protrusion is disposed between the carrying plate and the upper plate.

7. The heat transferring device according to claim 1, wherein the lower plate further comprises at least one positioning groove disposed on the periphery of the first perforation, and a gas storage canister is provided and comprises a positioning ring and a convex rib disposed on the positioning ring, wherein the convex rib of the positioning ring is capable of passing through the positioning grooves, and the gas storage canister is fastened by rotation.

8. The heat transferring device according to claim 1, further comprising a clamping portion, wherein the clamping portion comprises a buckle and a fastening portion or a steel ring, and the upper plate further comprises a periphery portion, wherein the buckle is disposed on the periphery portion of the upper plate and is connected with the fastening portion or the steel ring.

9. The heat transferring device according to claim 2, wherein the sleeve is one selected from the group consisting of plastic pipes, paper pipe, metal pipe, canvas pipe, thick film pipe and plastic film pipe, wherein the flow channel is in the shape selected from the group consisting of H-shape, M-shape/W-shape, S-shape, V-shape, regular shape, unregular shape, U-shape, N-shape/Z-shape, inlet-and-outlet-on-center shape and inlet-and-outlet-on-sides shape, wherein the fluid is one selected from the group consisting of a fluid capable of maintaining in flowing state, water, ethylene glycol, propylene glycol, a mixture of water and ethylene glycol, a mixture of water and propylene glycol, a mixture of water, ethylene glycol and propylene glycol, and a liquid with a temperature between 3° C. and 95° C.

10. The heat transferring device according to claim 1, wherein the material of the heat transferring component is one selected from the groups consisting of natural rubbers, synthetic rubbers, thermoplastics, composite materials composed of elastic fiber and rubber, composite materials composed of elastic fiber and thermoplastics, and a group consisting of the previously mentioned materials doped with a conductive material in a proportion ranged between 1 wt % to 30 wt %.

11. A heat transferring device comprising:
a heat transferring component in a shape of pouch and comprising at least one input end and at least one output end to allow a fluid to be inputted and outputted;
a sleeve disposed on and surrounding an exterior of the heat transferring component to restrict the shape and a position of the heat transferring component;
a lower plate comprising at least one first perforation;
an upper plate comprising at least one second perforation, wherein an end of the sleeve is connected to the lower plate and another end of the sleeve is connected to the upper plate; and
at least one support rod or at least one plate component connected to the upper plate and the lower plate;
wherein the heat transferring component further comprises at least one protrusion on the periphery, and the protrusion is fixed on the sleeve through at least one fastener.

12. The heat transferring device according to claim 11, further comprising a carrying plate connected to the upper plate, wherein the protrusion is disposed between the carrying plate and the upper plate.

13. The heat transferring device according to claim 11, further comprising a quick connector, wherein the lower plate further comprises at least one through hole, and the quick connector is connected to the lower plate through the through hole and is spatially corresponding to the first perforation.

14. The heat transferring device according to claim 11, wherein the lower plate or the sleeve comprises at least one through hole to allow the input end and the output end of the heat transferring component to pass therethrough and be protruded from the heat transferring component.

15. The heat transferring device according to claim 11, further comprising at least one guiding component, a scraper plate, a pressing plate, an upper plate component and a lower plate component, wherein the guiding component is disposed on the lower plate for guiding and positioning a gas storage canister, the scraper plate is connected to the upper plate, and the pressing plate is disposed on the scraper plate, wherein the upper plate component is connected to the upper plate, and the lower plate component is connected to the lower plate.

16. The heat transferring device according to claim 11, wherein the lower plate further comprises at least one positioning groove disposed on the periphery of the first perforation, and a gas storage canister is provided and comprises a positioning ring and a convex rib disposed on the positioning ring, wherein the convex rib of the positioning ring is capable of passing through the positioning grooves, and the gas storage canister is fastened by rotation.

17. A heat transferring device comprising:
a heat transferring component in a shape of pouch and comprising at least one input end and at least one output end to allow a fluid to be inputted and outputted;
a lower plate comprising at least one first perforation;
a sleeve disposed on and surrounding an exterior of the heat transferring component to restrict the shape and a position of the heat transferring component, wherein an end of the sleeve is connected to the lower plate,
an upper plate comprising at least one second perforation, wherein another end of the sleeve is connected to the upper plate; and
a clamping portion comprising a buckle and a fastening portion or a steel ring, and the upper plate further comprises a periphery portion, wherein the buckle is disposed on the periphery portion of the upper plate and is connected with the fastening portion or the steel ring, wherein the heat transferring component further comprises at least one protrusion on the periphery, and the protrusion is fixed on the sleeve through at least one fastener.

18. The heat transferring device according to claim 17, further comprising at least one guiding component, a scraper plate, a pressing plate, an upper plate component and a lower plate component, wherein the guiding component is disposed on the lower plate for guiding and positioning a gas storage canister, the scraper plate is connected to the upper plate, and the pressing plate is disposed on the scraper plate, wherein the upper plate component is connected to the upper plate, and the lower plate component is connected to the lower plate.

19. The heat transferring device according to claim 17, comprising a carrying plate connected to the upper plate, and the protrusion is disposed between the carrying plate and the upper plate, wherein the lower plate or the sleeve comprises at least one through hole to allow the input end and the output end of the heat transferring component to pass therethrough and be protruded from the heat transferring component.

20. The heat transferring device according to claim 17, further comprising a quick connector, wherein the lower plate further comprises at least one through hole, and the quick connector is connected to the lower plate through the through hole and is spatially corresponding to the first perforation, wherein the lower plate further comprises at least one positioning groove disposed on the periphery of the first perforation, and a gas storage canister is provided and comprises a positioning ring and a convex rib disposed on the positioning ring, wherein the convex rib of the positioning ring is capable of passing through the positioning grooves, and the gas storage canister is fastened by rotation.

* * * * *